(12) United States Patent
Hoare et al.

(10) Patent No.: US 10,682,010 B2
(45) Date of Patent: Jun. 16, 2020

(54) WAFFLE MAKER

(71) Applicant: BREVILLE PTY LIMITED, Alexandria, New South Wales (AU)

(72) Inventors: Richard Hoare, Lane Cove (AU); Brendan John Foxlee, Earlwood (AU); Emma Craig, Ultimo (AU); Vyvyan Rose, Vaucluse (AU); Ashley Marsh-Croft, Woollahra (AU)

(73) Assignee: BREVILLE PTY LIMITED, Alexandria, New South Wales (AU)

( * ) Notice: Subject to any disclaimer, the term of this patent is extended or adjusted under 35 U.S.C. 154(b) by 649 days.

(21) Appl. No.: 14/426,160

(22) PCT Filed: Apr. 16, 2013

(86) PCT No.: PCT/AU2013/000386
§ 371 (c)(1),
(2) Date: Mar. 4, 2015

(87) PCT Pub. No.: WO2014/036588
PCT Pub. Date: Mar. 13, 2014

(65) Prior Publication Data
US 2015/0230659 A1 Aug. 20, 2015

(30) Foreign Application Priority Data
Sep. 6, 2012 (AU) ................. 2012903873

(51) Int. Cl.
*A47J 37/06* (2006.01)
*A47J 37/08* (2006.01)

(52) U.S. Cl.
CPC ............ *A47J 37/0611* (2013.01); *A47J 37/06* (2013.01); *A47J 37/08* (2013.01); *A47J 2037/0617* (2013.01)

(58) Field of Classification Search
CPC ............... A47J 37/0611; A47J 36/36; A47J 2037/0617; A47J 37/08; A47J 37/06
USPC ......... 99/375, 376, 377, 379, 390, 441, 422, 99/426, 428, 448, 450, 645; 219/524, 219/385, 386, 387, 392, 395, 396, 399, 219/404, 407, 408, 409, 443.1, 446.1, 219/447.1, 448.13, 448.17, 465.1, 538,
(Continued)

(56) References Cited

U.S. PATENT DOCUMENTS 1,742,945 A * 1/1930 Banff ................... A47J 37/0611
99/380
1,969,361 A 8/1934 Fajen
(Continued)

FOREIGN PATENT DOCUMENTS

FR 2951052 A1 4/2011
WO WO-02/21984 A1 3/2002

OTHER PUBLICATIONS

Examination Report for Australian Patent Application No. 2017216575, dated May 25, 2018.
(Continued)

*Primary Examiner* — Tu B Hoang
*Assistant Examiner* — Masahiko Muranami
(74) *Attorney, Agent, or Firm* — Marshall, Gerstein & Borun LLP

(57) ABSTRACT

A food cooking appliance such as a waffle maker, pizza maker or toaster uses a combination of sensor inputs and optional user preferences to determine an optimal cooking time.

22 Claims, 33 Drawing Sheets

(58) Field of Classification Search
USPC ....... 219/537, 536, 533, 532, 525, 521, 515;
392/373, 383, 384, 398
See application file for complete search history.

(56) References Cited

U.S. PATENT DOCUMENTS

| | | | | |
|---|---|---|---|---|
| 2,036,523 A | * | 4/1936 | Freemon | A47J 37/00 219/452.13 |
| 2,632,380 A | * | 3/1953 | Knapp | A47J 37/0611 219/525 |
| 2,765,727 A | * | 10/1956 | Lipsich | A47J 37/0611 219/525 |
| 2,899,888 A | * | 8/1959 | Koci | A47J 37/0611 219/450.1 |
| 3,696,734 A | * | 10/1972 | Beasley | A47J 37/0611 99/331 |
| 4,165,682 A | * | 8/1979 | Weiss | A47J 37/0611 219/524 |
| 4,206,345 A | * | 6/1980 | Maass | A47J 37/0611 219/386 |
| 4,884,626 A | | 12/1989 | Filipowski | |
| 5,363,748 A | * | 11/1994 | Boehm | A47J 27/04 126/20 |
| 5,606,905 A | * | 3/1997 | Boehm | A47J 37/0611 126/369 |
| 5,636,564 A | | 6/1997 | Weiss | |
| 6,198,078 B1 | | 3/2001 | Wanat et al. | |
| 6,427,581 B1 | | 8/2002 | Wu | |
| 2003/0127451 A1 | | 7/2003 | Lile | |
| 2004/0020370 A1 | | 2/2004 | Jackson et al. | |
| 2004/0182252 A1 | * | 9/2004 | Brady | A47J 37/0611 99/372 |
| 2006/0049169 A1 | | 3/2006 | Li | |
| 2006/0201333 A1 | | 9/2006 | Friel et al. | |
| 2009/0320695 A1 | * | 12/2009 | Serra | A47J 37/0611 99/380 |

OTHER PUBLICATIONS

International Search Report and Written Opinion for PCT/AU2013/000386, dated Jun. 12, 2013.
International Preliminary Report on Patentability for PCT/AU2013/000386, dated Mar. 10, 2015.
Office Action for Australian Patent Application No. 2013313006, dated Feb. 3, 2017.
Extended European Search Report for European Patent Application No. 13834835.4, dated May 9, 2016.

* cited by examiner

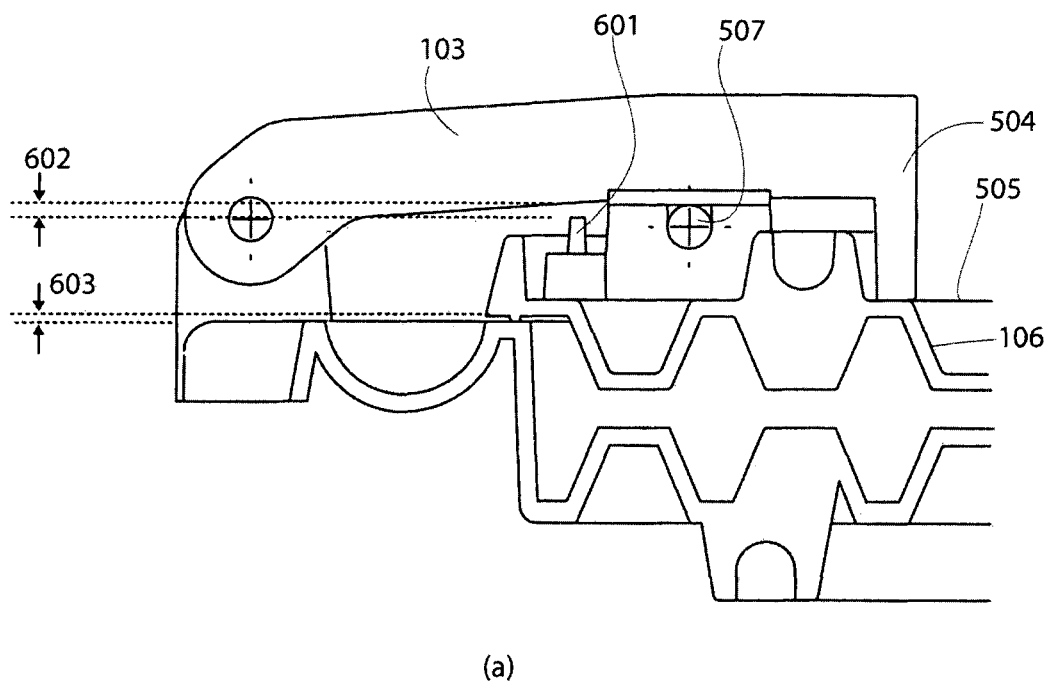
(a)
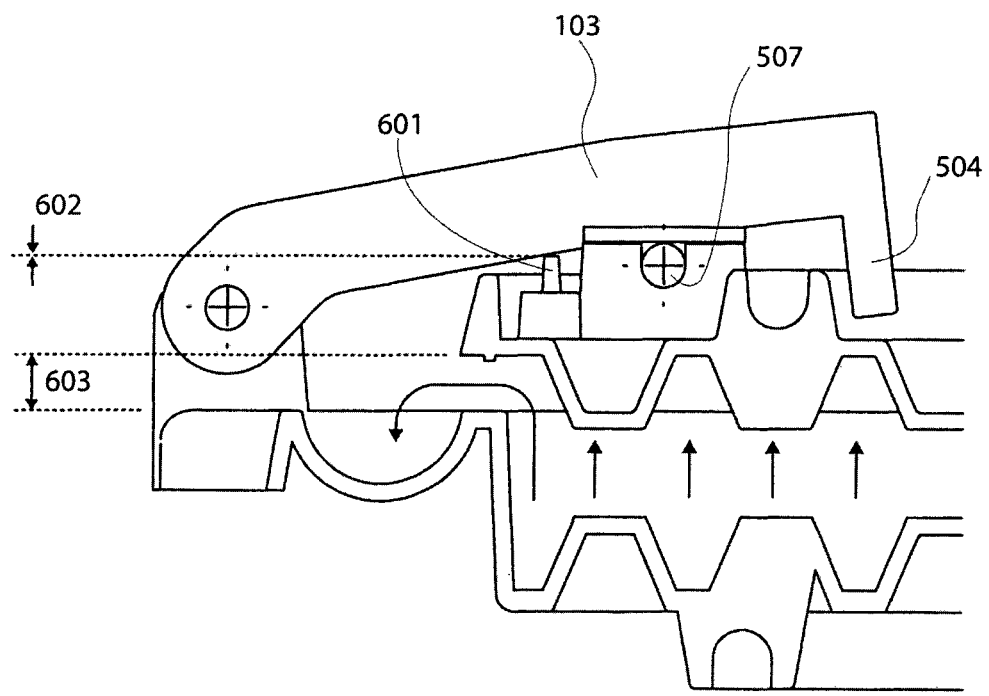
(b)
Fig. 6

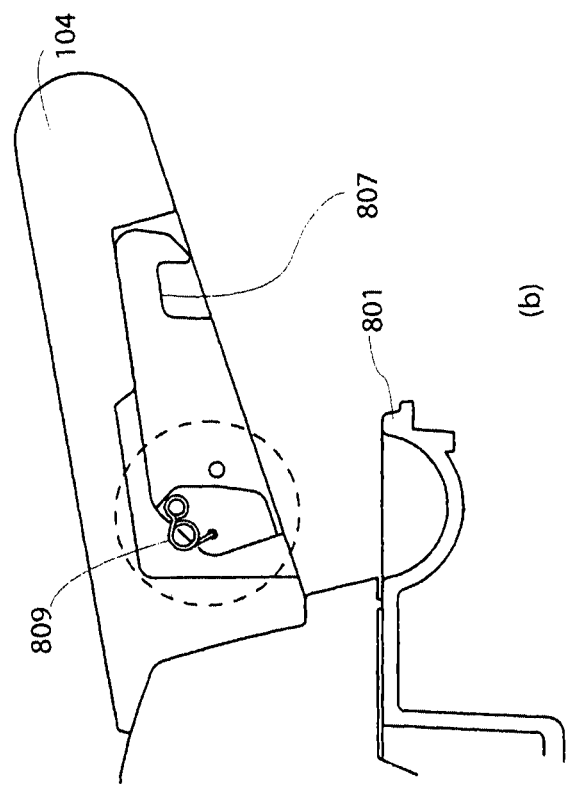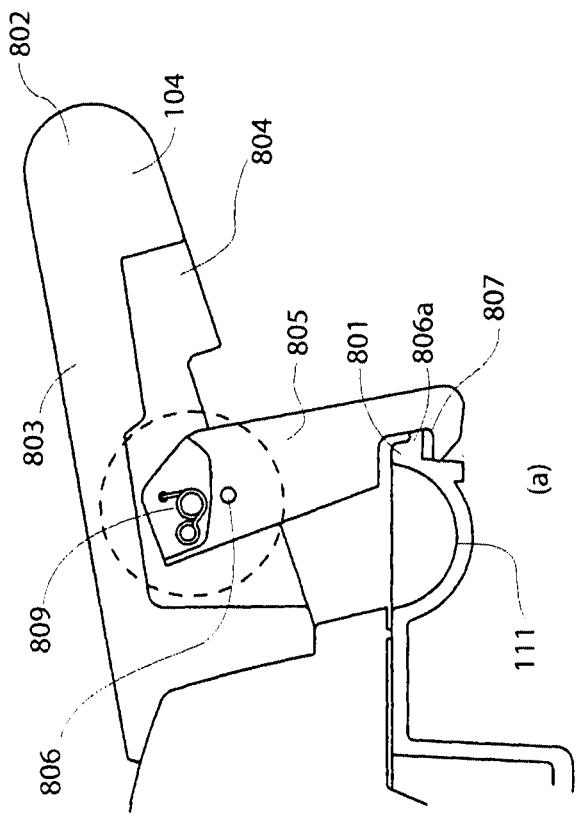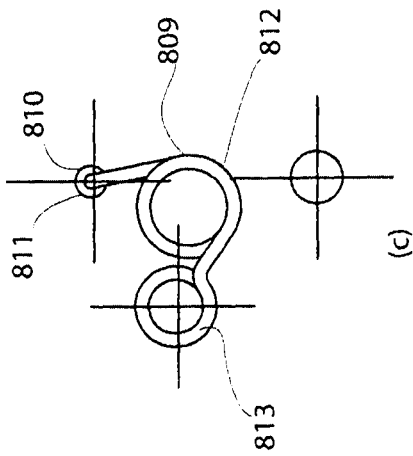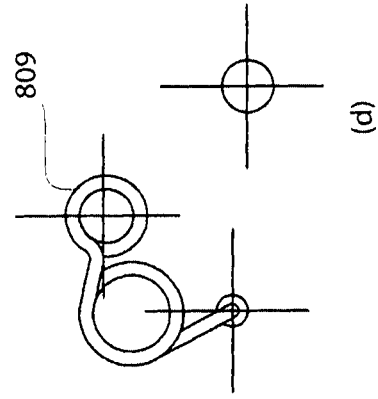
Fig. 8

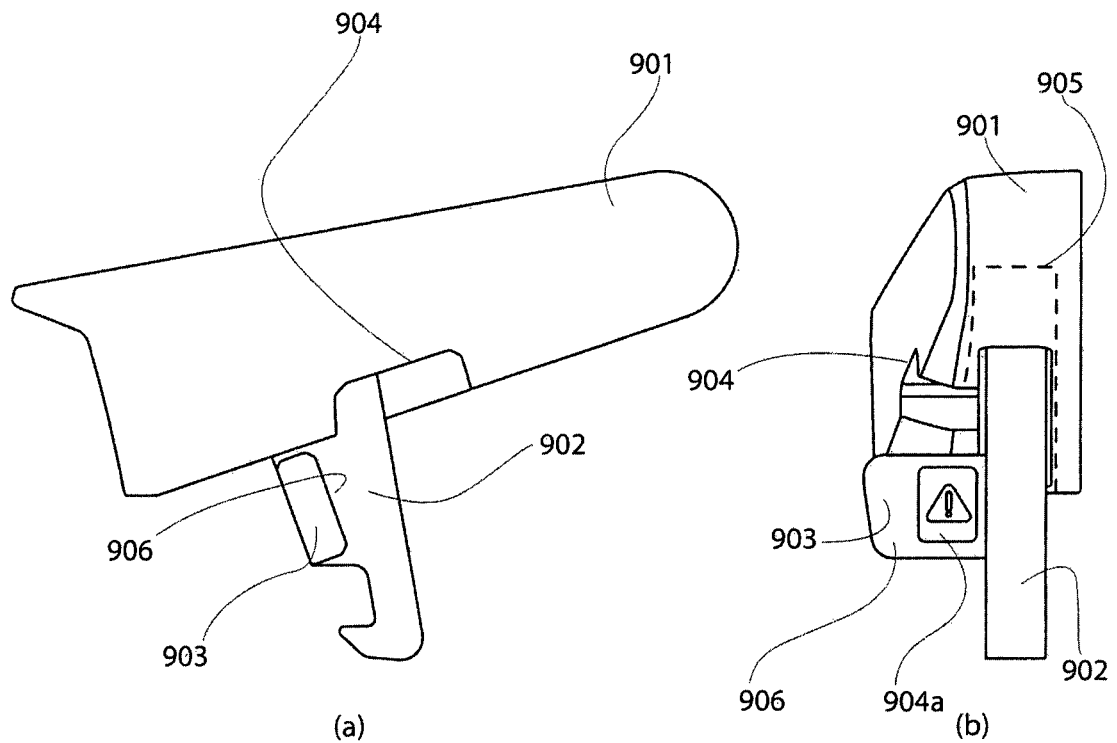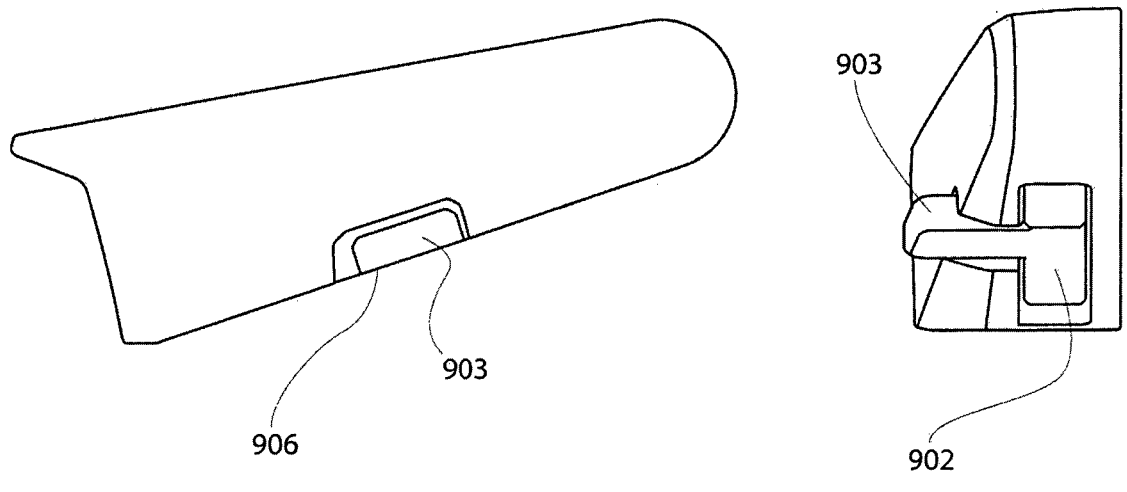
Fig. 9

| X VALUE | BATTER TYPE | TEMP. BAND | THERMOSTAT | TIME (SEC) |
|---|---|---|---|---|
|  | BELGIAN |  |  |  |
| X1 |  | 1 | ON | 330 |
| X2 |  |  | OFF | 345 |
| X3 |  | 2 | ON | 315 |
| X4 |  |  | OFF | 345 |
| X5 |  | 3 | ON | 285 |
| X6 |  |  | OFF | 360 |
| X7 |  | 4 | ON | 255 |
| X8 |  |  | OFF | 330 |
| X9 |  | 5 | ON | 240 |
| X10 |  |  | OFF | 300 |
| X11 |  | 6 | ON | 255 |
| X12 |  |  | OFF | 270 |
|  | Type 2 |  |  |  |
| X13 |  | 1 | ON | 335 |
| X14 |  |  | OFF | 350 |
| X15 |  | 2 | ON | 320 |
| X16 |  |  | OFF | 350 |
| X17 |  | 3 | ON | 290 |
| X18 |  |  | OFF | 365 |
| X19 |  | 4 | ON | 260 |
| X20 |  |  | OFF | 335 |
| X21 |  | 5 | ON | 245 |
| X22 |  |  | OFF | 305 |
| X23 |  | 6 | ON | 260 |
| X24 |  |  | OFF | 275 |
|  | type 3 |  |  |  |
| X25 |  | 1 | ON | 325 |
| X26 |  |  | OFF | 340 |
| X27 |  | 2 | ON | 310 |
| X28 |  |  | OFF | 340 |
| X29 |  | 3 | ON | 280 |
| X30 |  |  | OFF | 355 |
| X31 |  | 4 | ON | 250 |
| X32 |  |  | OFF | 325 |
| X33 |  | 5 | ON | 235 |
| X34 |  |  | OFF | 295 |
| X35 |  | 6 | ON | 250 |
| X36 |  |  | OFF | 265 |
|  | type 4 |  |  |  |
| X37 |  | 1 | ON | 340 |
| X38 |  |  | OFF | 355 |
| X39 |  | 2 | ON | 325 |
| X40 |  |  | OFF | 355 |
| X41 |  | 3 | ON | 295 |
| X42 |  |  | OFF | 370 |
| X43 |  | 4 | ON | 265 |
| X44 |  |  | OFF | 340 |
| X45 |  | 5 | ON | 250 |
| X46 |  |  | OFF | 310 |
| X47 |  | 6 | ON | 265 |
| X48 |  |  | OFF | 280 |

TEMPERATURE BANDS

| BAND 1 | <139 | °c |
|---|---|---|
| BAND 2 | 140-159 | °c |
| BAND 3 | 160-179 | °c |
| BAND 4 | 180-199 | °c |
| BAND 5 | 200-219 | °c |
| BAND 6 | >220 | °c |

Fig. 18

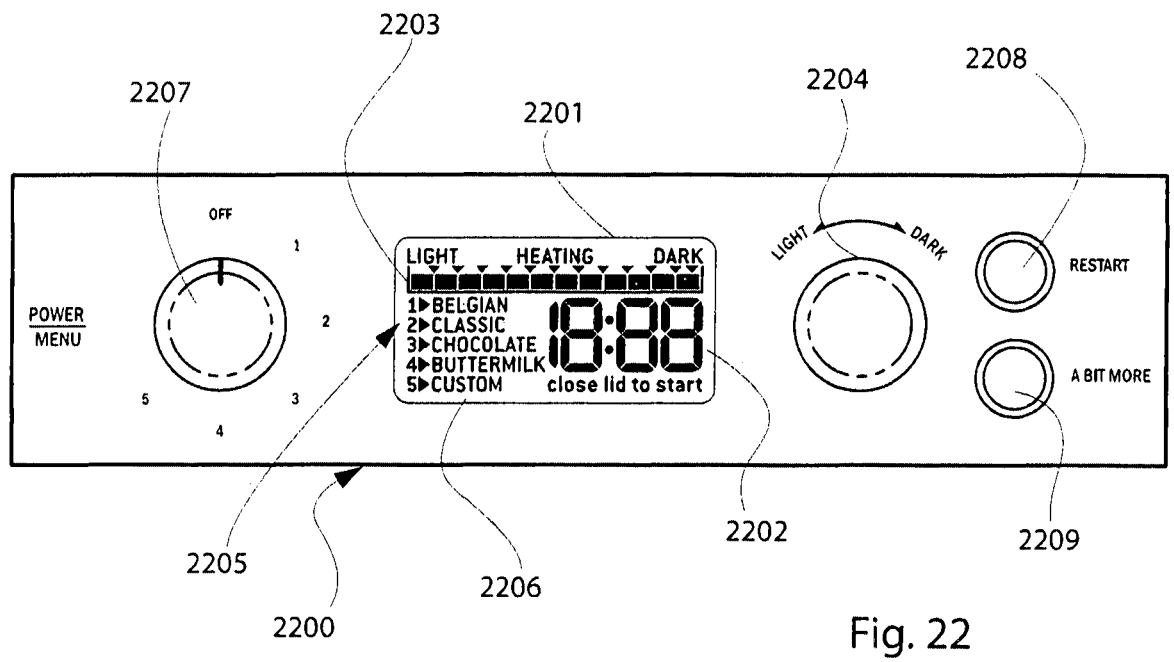
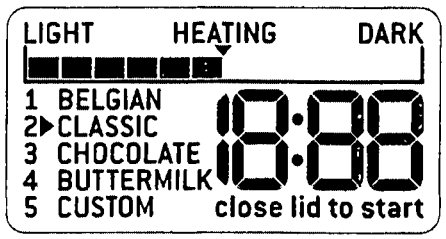
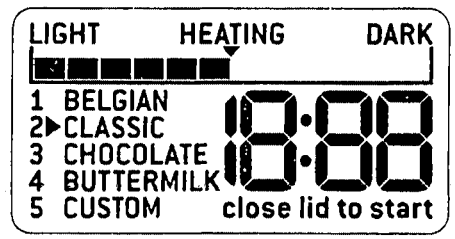
Fig. 22

BELGIAN

| thermostat state | temperature band (°C) | bars | time (sec) | time ref (min.sec) |
|---|---|---|---|---|
| ON | < 159 | 1 | 95 | 01:35 |
| | | 2 | 105 | 01:45 |
| | | 3 | 157.5 | 02:38 |
| | | 4 | 210 | 03:30 |
| | | 5 | 262.5 | 04:23 |
| | | 6 | *315* | 05:15 |
| | | 7 | 367.5 | 06:07 |
| | | 8 | 420 | 07:00 |
| | | 9 | 472.5 | 07:52 |
| | | 10 | 525 | 08:45 |
| | | 11 | 577.5 | 09:37 |
| | | 12 | 630 | 10:30 |
| | 160 - 169 | 1 | 90 | 01:30 |
| | | 2 | 100 | 01:40 |
| | | 3 | 150 | 02:30 |
| | | 4 | 200 | 03:20 |
| | | 5 | 250 | 04:10 |
| | | 6 | *300* | 05:00 |
| | | 7 | 350 | 05:50 |
| | | 8 | 400 | 06:40 |
| | | 9 | 450 | 07:30 |
| | | 10 | 500 | 08:20 |
| | | 11 | 550 | 09:10 |
| | | 12 | 600 | 10:00 |
| | 170 - 179 | 1 | 85 | 01:25 |
| | | 2 | 95 | 01:35 |
| | | 3 | 142.5 | 02:23 |
| | | 4 | 190 | 03:10 |
| | | 5 | 237.5 | 03:58 |
| | | 6 | *285* | 04:45 |
| | | 7 | 332.5 | 05:32 |
| | | 8 | 380 | 06:20 |
| | | 9 | 427.5 | 07:07 |
| | | 10 | 475 | 07:55 |
| | | 11 | 522.5 | 08:42 |
| | | 12 | 570 | 09:30 |
| | > 180 | 1 | 75 | 01:15 |
| | | 2 | 85 | 01:25 |
| | | 3 | 127.5 | 02:07 |
| | | 4 | 170 | 02:50 |
| | | 5 | 212.5 | 03:33 |
| | | 6 | *255* | 04:15 |
| | | 7 | 297.5 | 04:58 |
| | | 8 | 340 | 05:40 |
| | | 9 | 382.5 | 06:22 |
| | | 10 | 425 | 07:05 |
| | | 11 | 467.5 | 07:47 |
| | | 12 | 510 | 08:30 |

Fig. 23

BELGIAN

| thermostat state | temperature band (ºC) | bars | time (sec) | time ref (min.sec) |
|---|---|---|---|---|
| OFF | < 159 | 1 | 100 | 01:40 |
| | | 2 | 110 | 01:50 |
| | | 3 | 165 | 02:45 |
| | | 4 | 220 | 03:40 |
| | | 5 | 275 | 04:35 |
| | | 6 | *330* | 05:30 |
| | | 7 | 385 | 06:25 |
| | | 8 | 440 | 07:20 |
| | | 9 | 495 | 08:15 |
| | | 10 | 550 | 09:10 |
| | | 11 | 605 | 10:05 |
| | | 12 | 660 | 11:00 |
| | 160 - 169 | 1 | 110 | 01:50 |
| | | 2 | 120 | 02:00 |
| | | 3 | 180 | 03:00 |
| | | 4 | 240 | 04:00 |
| | | 5 | 300 | 05:00 |
| | | 6 | *360* | 06:00 |
| | | 7 | 420 | 07:00 |
| | | 8 | 480 | 08:00 |
| | | 9 | 540 | 09:00 |
| | | 10 | 600 | 10:00 |
| | | 11 | 660 | 11:00 |
| | | 12 | 720 | 12:00 |
| | 170 - 179 | 1 | 105 | 01:45 |
| | | 2 | 115 | 01:55 |
| | | 3 | 172.5 | 02:53 |
| | | 4 | 230 | 03:50 |
| | | 5 | 287.5 | 04:47 |
| | | 6 | *345* | 05:45 |
| | | 7 | 402.5 | 06:43 |
| | | 8 | 460 | 07:40 |
| | | 9 | 517.5 | 08:38 |
| | | 10 | 575 | 09:35 |
| | | 11 | 632.5 | 10:32 |
| | | 12 | 690 | 11:30 |
| | > 180 | 1 | 100 | 01:40 |
| | | 2 | 110 | 01:50 |
| | | 3 | 165 | 02:45 |
| | | 4 | 220 | 03:40 |
| | | 5 | 275 | 04:35 |
| | | 6 | *330* | 05:30 |
| | | 7 | 385 | 06:25 |
| | | 8 | 440 | 07:20 |
| | | 9 | 495 | 08:15 |
| | | 10 | 550 | 09:10 |
| | | 11 | 605 | 10:05 |
| | | 12 | 660 | 11:00 |

Fig. 24

CLASSIC

| thermostat state | temperature band (ºC) | bars | time (sec) | time ref (min.sec) |
|---|---|---|---|---|
| ON | < 159 | 1 | 103.33 | 01:43 |
| | | 2 | 113.33 | 01:53 |
| | | 3 | 170.00 | 02:50 |
| | | 4 | 226.67 | 03:47 |
| | | 5 | 283.33 | 04:43 |
| | | 6 | *340.00* | 05:40 |
| | | 7 | 396.67 | 06:37 |
| | | 8 | 453.33 | 07:33 |
| | | 9 | 510.00 | 08:30 |
| | | 10 | 566.67 | 09:27 |
| | | 11 | 623.33 | 10:23 |
| | | 12 | 680.00 | 11:20 |
| | 160 - 169 | 1 | 98.33 | 01:38 |
| | | 2 | 108.33 | 01:48 |
| | | 3 | 162.50 | 02:43 |
| | | 4 | 216.67 | 03:37 |
| | | 5 | 270.83 | 04:31 |
| | | 6 | *325.00* | 05:25 |
| | | 7 | 379.17 | 06:19 |
| | | 8 | 433.33 | 07:13 |
| | | 9 | 487.50 | 08:07 |
| | | 10 | 541.67 | 09:02 |
| | | 11 | 595.83 | 09:56 |
| | | 12 | 650.00 | 10:50 |
| | 170 - 179 | 1 | 93.33 | 01:33 |
| | | 2 | 103.33 | 01:43 |
| | | 3 | 155.00 | 02:35 |
| | | 4 | 206.67 | 03:27 |
| | | 5 | 258.33 | 04:18 |
| | | 6 | *310.00* | 05:10 |
| | | 7 | 361.67 | 06:02 |
| | | 8 | 413.33 | 06:53 |
| | | 9 | 465.00 | 07:45 |
| | | 10 | 516.67 | 08:37 |
| | | 11 | 568.33 | 09:28 |
| | | 12 | 620.00 | 10:20 |
| | > 180 | 1 | 83.33 | 01:23 |
| | | 2 | 93.33 | 01:33 |
| | | 3 | 140.00 | 02:20 |
| | | 4 | 186.67 | 03:07 |
| | | 5 | 233.33 | 03:53 |
| | | 6 | *280.00* | 04:40 |
| | | 7 | 326.67 | 05:27 |
| | | 8 | 373.33 | 06:13 |
| | | 9 | 420.00 | 07:00 |
| | | 10 | 466.67 | 07:47 |
| | | 11 | 513.33 | 08:33 |
| | | 12 | 560.00 | 09:20 |

Fig. 25

*CLASSIC*

| thermostat state | temperature band (ºC) | bars | time (sec) | time ref (min.sec) |
|---|---|---|---|---|
| OFF | < 159 | 1 | 108.33 | 01:48 |
| | | 2 | 118.33 | 01:58 |
| | | 3 | 177.50 | 02:58 |
| | | 4 | 236.67 | 03:57 |
| | | 5 | 295.83 | 04:56 |
| | | 6 | *355.00* | 05:55 |
| | | 7 | 414.17 | 06:54 |
| | | 8 | 473.33 | 07:53 |
| | | 9 | 532.50 | 08:52 |
| | | 10 | 591.67 | 09:52 |
| | | 11 | 650.83 | 10:51 |
| | | 12 | 710.00 | 11:50 |
| | 160 - 169 | 1 | 118.33 | 01:58 |
| | | 2 | 128.33 | 02:08 |
| | | 3 | 192.50 | 03:13 |
| | | 4 | 256.67 | 04:17 |
| | | 5 | 320.83 | 05:21 |
| | | 6 | *385.00* | 06:25 |
| | | 7 | 449.17 | 07:29 |
| | | 8 | 513.33 | 08:33 |
| | | 9 | 577.50 | 09:37 |
| | | 10 | 641.67 | 10:42 |
| | | 11 | 705.83 | 11:46 |
| | | 12 | 770.00 | 12:50 |
| | 170 - 179 | 1 | 113.33 | 01:53 |
| | | 2 | 123.33 | 02:03 |
| | | 3 | 185.00 | 03:05 |
| | | 4 | 246.67 | 04:07 |
| | | 5 | 308.33 | 05:08 |
| | | 6 | *370.00* | 06:10 |
| | | 7 | 431.67 | 07:12 |
| | | 8 | 493.33 | 08:13 |
| | | 9 | 555.00 | 09:15 |
| | | 10 | 616.67 | 10:17 |
| | | 11 | 678.33 | 11:18 |
| | | 12 | 740.00 | 12:20 |
| | > 180 | 1 | 108.33 | 01:48 |
| | | 2 | 118.33 | 01:58 |
| | | 3 | 177.50 | 02:58 |
| | | 4 | 236.67 | 03:57 |
| | | 5 | 295.83 | 04:56 |
| | | 6 | *355.00* | 05:55 |
| | | 7 | 414.17 | 06:54 |
| | | 8 | 473.33 | 07:53 |
| | | 9 | 532.50 | 08:52 |
| | | 10 | 591.67 | 09:52 |
| | | 11 | 650.83 | 10:51 |
| | | 12 | 710.00 | 11:50 |

Fig. 26

BUTTERMILK

| thermostat state | temperature band (ºC) | bars | time (sec) | time ref. (min.sec) |
|---|---|---|---|---|
| ON | < 159 | 1 | 108.33 | 01:48 |
| | | 2 | 118.33 | 01:58 |
| | | 3 | 177.50 | 02:58 |
| | | 4 | 236.67 | 03:57 |
| | | 5 | 295.83 | 04:56 |
| | | 6 | *355.00* | 05:55 |
| | | 7 | 414.17 | 06:54 |
| | | 8 | 473.33 | 07:53 |
| | | 9 | 532.50 | 08:52 |
| | | 10 | 591.67 | 09:52 |
| | | 11 | 650.83 | 10:51 |
| | | 12 | 710.00 | 11:50 |
| | 160 - 169 | 1 | 103.33 | 01:43 |
| | | 2 | 113.33 | 01:53 |
| | | 3 | 170.00 | 02:50 |
| | | 4 | 226.67 | 03:47 |
| | | 5 | 283.33 | 04:43 |
| | | 6 | *340.00* | 05:40 |
| | | 7 | 396.67 | 06:37 |
| | | 8 | 453.33 | 07:33 |
| | | 9 | 510.00 | 08:30 |
| | | 10 | 566.67 | 09:27 |
| | | 11 | 623.33 | 10:23 |
| | | 12 | 680.00 | 11:20 |
| | 170 - 179 | 1 | 98.33 | 01:38 |
| | | 2 | 108.33 | 01:48 |
| | | 3 | 162.50 | 02:43 |
| | | 4 | 216.67 | 03:37 |
| | | 5 | 270.83 | 04:31 |
| | | 6 | *325.00* | 05:25 |
| | | 7 | 379.17 | 06:19 |
| | | 8 | 433.33 | 07:13 |
| | | 9 | 487.50 | 08:07 |
| | | 10 | 541.67 | 09:02 |
| | | 11 | 595.83 | 09:56 |
| | | 12 | 650.00 | 10:50 |
| | > 180 | 1 | 88.33 | 01:28 |
| | | 2 | 98.33 | 01:38 |
| | | 3 | 147.50 | 02:28 |
| | | 4 | 196.67 | 03:17 |
| | | 5 | 245.83 | 04:06 |
| | | 6 | *295.00* | 04:55 |
| | | 7 | 344.17 | 05:44 |
| | | 8 | 393.33 | 06:33 |
| | | 9 | 442.50 | 07:23 |
| | | 10 | 491.67 | 08:12 |
| | | 11 | 540.83 | 09:01 |
| | | 12 | 590.00 | 09:50 |

Fig. 27

BUTTERMILK

| thermostat state | temperature band (ºC) | bars | time (sec) | time ref (min.sec) |
|---|---|---|---|---|
| OFF | < 159 | 1 | 113.33 | 01:53 |
| | | 2 | 123.33 | 02:03 |
| | | 3 | 185.00 | 03:05 |
| | | 4 | 246.67 | 04:07 |
| | | 5 | 308.33 | 05:08 |
| | | 6 | *370.00* | 06:10 |
| | | 7 | 431.67 | 07:12 |
| | | 8 | 493.33 | 08:13 |
| | | 9 | 555.00 | 09:15 |
| | | 10 | 616.67 | 10:17 |
| | | 11 | 678.33 | 11:18 |
| | | 12 | 740.00 | 12:20 |
| | 160 - 169 | 1 | 123.33 | 02:03 |
| | | 2 | 133.33 | 02:13 |
| | | 3 | 200.00 | 03:20 |
| | | 4 | 266.67 | 04:27 |
| | | 5 | 333.33 | 05:33 |
| | | 6 | *400.00* | 06:40 |
| | | 7 | 466.67 | 07:47 |
| | | 8 | 533.33 | 08:53 |
| | | 9 | 600.00 | 10:00 |
| | | 10 | 666.67 | 11:07 |
| | | 11 | 733.33 | 12:13 |
| | | 12 | 800.00 | 13:20 |
| | 170 - 179 | 1 | 118.33 | 01:58 |
| | | 2 | 128.33 | 02:08 |
| | | 3 | 192.50 | 03:13 |
| | | 4 | 256.67 | 04:17 |
| | | 5 | 320.83 | 05:21 |
| | | 6 | *385.00* | 06:25 |
| | | 7 | 449.17 | 07:29 |
| | | 8 | 513.33 | 08:33 |
| | | 9 | 577.50 | 09:37 |
| | | 10 | 641.67 | 10:42 |
| | | 11 | 705.83 | 11:46 |
| | | 12 | 770.00 | 12:50 |
| | > 180 | 1 | 113.33 | 01:53 |
| | | 2 | 123.33 | 02:03 |
| | | 3 | 185.00 | 03:05 |
| | | 4 | 246.67 | 04:07 |
| | | 5 | 308.33 | 05:08 |
| | | 6 | *370.00* | 06:10 |
| | | 7 | 431.67 | 07:12 |
| | | 8 | 493.33 | 08:13 |
| | | 9 | 555.00 | 09:15 |
| | | 10 | 616.67 | 10:17 |
| | | 11 | 678.33 | 11:18 |
| | | 12 | 740.00 | 12:20 |

Fig. 28

CHOCOLATE

| thermostat state | temperature band (ºC) | bars | time (sec) | time ref (min.sec) |
|---|---|---|---|---|
| ON | < 159 | 1 | 88.33 | 01:28 |
| | | 2 | 98.33 | 01:38 |
| | | 3 | 147.50 | 02:28 |
| | | 4 | 196.67 | 03:17 |
| | | 5 | 245.83 | 04:06 |
| | | 6 | *295.00* | 04:55 |
| | | 7 | 344.17 | 05:44 |
| | | 8 | 393.33 | 06:33 |
| | | 9 | 442.50 | 07:23 |
| | | 10 | 491.67 | 08:12 |
| | | 11 | 540.83 | 09:01 |
| | | 12 | 590.00 | 09:50 |
| | 160 - 169 | 1 | 83.33 | 01:23 |
| | | 2 | 93.33 | 01:33 |
| | | 3 | 140.00 | 02:20 |
| | | 4 | 186.67 | 03:07 |
| | | 5 | 233.33 | 03:53 |
| | | 6 | *280.00* | 04:40 |
| | | 7 | 326.67 | 05:27 |
| | | 8 | 373.33 | 06:13 |
| | | 9 | 420.00 | 07:00 |
| | | 10 | 466.67 | 07:47 |
| | | 11 | 513.33 | 08:33 |
| | | 12 | 560.00 | 09:20 |
| | 170 - 179 | 1 | 78.33 | 01:18 |
| | | 2 | 88.33 | 01:28 |
| | | 3 | 132.50 | 02:13 |
| | | 4 | 176.67 | 02:57 |
| | | 5 | 220.83 | 03:41 |
| | | 6 | *265.00* | 04:25 |
| | | 7 | 309.17 | 05:09 |
| | | 8 | 353.33 | 05:53 |
| | | 9 | 397.50 | 06:37 |
| | | 10 | 441.67 | 07:22 |
| | | 11 | 485.83 | 08:06 |
| | | 12 | 530.00 | 08:50 |
| | > 180 | 1 | 68.33 | 01:08 |
| | | 2 | 78.33 | 01:18 |
| | | 3 | 117.50 | 01:58 |
| | | 4 | 156.67 | 02:37 |
| | | 5 | 195.83 | 03:16 |
| | | 6 | *235.00* | 03:55 |
| | | 7 | 274.17 | 04:34 |
| | | 8 | 313.33 | 05:13 |
| | | 9 | 352.50 | 05:53 |
| | | 10 | 391.67 | 06:32 |
| | | 11 | 430.83 | 07:11 |
| | | 12 | 470.00 | 07:50 |

Fig. 29

*CHOCOLATE*

| thermostat state | temperature band (ºC) | bars | time (sec) | time ref (min.sec) |
|---|---|---|---|---|
| OFF | < 159 | 1 | 93.33 | 01:33 |
| | | 2 | 103.33 | 01:43 |
| | | 3 | 155.00 | 02:35 |
| | | 4 | 206.67 | 03:27 |
| | | 5 | 258.33 | 04:18 |
| | | 6 | *310.00* | 05:10 |
| | | 7 | 361.67 | 06:02 |
| | | 8 | 413.33 | 06:53 |
| | | 9 | 465.00 | 07:45 |
| | | 10 | 516.67 | 08:37 |
| | | 11 | 568.33 | 09:28 |
| | | 12 | 620.00 | 10:20 |
| | 160 - 169 | 1 | 103.33 | 01:43 |
| | | 2 | 113.33 | 01:53 |
| | | 3 | 170.00 | 02:50 |
| | | 4 | 226.67 | 03:47 |
| | | 5 | 283.33 | 04:43 |
| | | 6 | *340.00* | 05:40 |
| | | 7 | 396.67 | 06:37 |
| | | 8 | 453.33 | 07:33 |
| | | 9 | 510.00 | 08:30 |
| | | 10 | 566.67 | 09:27 |
| | | 11 | 623.33 | 10:23 |
| | | 12 | 680.00 | 11:20 |
| | 170 - 179 | 1 | 98.33 | 01:38 |
| | | 2 | 108.33 | 01:48 |
| | | 3 | 162.50 | 02:43 |
| | | 4 | 216.67 | 03:37 |
| | | 5 | 270.83 | 04:31 |
| | | 6 | *325.00* | 05:25 |
| | | 7 | 379.17 | 06:19 |
| | | 8 | 433.33 | 07:13 |
| | | 9 | 487.50 | 08:07 |
| | | 10 | 541.67 | 09:02 |
| | | 11 | 595.83 | 09:56 |
| | | 12 | 650.00 | 10:50 |
| | > 180 | 1 | 93.33 | 01:33 |
| | | 2 | 103.33 | 01:43 |
| | | 3 | 155.00 | 02:35 |
| | | 4 | 206.67 | 03:27 |
| | | 5 | 258.33 | 04:18 |
| | | 6 | *310.00* | 05:10 |
| | | 7 | 361.67 | 06:02 |
| | | 8 | 413.33 | 06:53 |
| | | 9 | 465.00 | 07:45 |
| | | 10 | 516.67 | 08:37 |
| | | 11 | 568.33 | 09:28 |
| | | 12 | 620.00 | 10:20 |

Fig. 30

WAFFLE MAKER

FIELD OF THE INVENTION

The invention pertains to kitchen appliances and more particularly to an electric waffle maker.

BACKGROUND OF THE INVENTION

Electric waffle makers or waffle irons are well known. A waffle maker generally comprises two heated and hinged together metal plates that are brought together after a waffle batter has been deposited on the lower plate. The two plates or cooking surfaces increase the surface area of the waffle, reduce the cooking time and contribute texture to the finished food article. The mould created by the two plates is open around the edges. The open edges allow excess batter to escape so that the shape of the finished product is preserved.

Waffle batters vary in content and cooking characteristics. Further, different users will have differing tastes as to how they prefer their waffles cooked.

Specific teachings are provided in relation to processor controlled waffle makers and food toasters. However these teachings should be considered relevant to a processor controlled appliance that cook foods in accordance with a nominal or default time that is modified in accordance with one or more user input preferences and one or more properties of the device itself.

As shown in FIG. 31 a toaster for bread and other food products 3000 comprises an enclosure 3001 within which is located a manual or motorised mechanism 3002 for raising and lowering a carriage 3003. Teachings relating to toaster contained in the applicant's PCT application PCT/AU2012/001532 are incorporated here by reference. The carriage is affixed to a food rack 3004 for transporting food up and down between an array of heating elements in a toasting cavity that are controlled by, for example, a processor 3005. The processor is also adapted to receive information or signals from sensors relating to, for example, the position of the carriage, the temperature in the toasting cavity, various user inputs, toast shade selection, supplemental cycle selection, defrost cycle, selection, food types etc.

These teachings may also be applied to a piazza maker, grill or other cooking appliance.

OBJECTS AND SUMMARY OF THE INVENTION

It is an object of the invention to provide a waffle maker that contributes to the ease of cooking a waffle and the ease of cleaning the device that cooks the waffle.

It is another object of the invention to provide a waffle maker giving a user increased control over the cooking process and its outcome.

It is another object of the invention to provide a waffle cooker having a display that is informative and easy to interpret.

It is another object of the invention to provide a waffle cooker that is versatile and predictable in its performance.

BRIEF DESCRIPTION OF THE DRAWING FIGURES

In order that the invention be better understood, reference is now made to the following drawing figures in which.

Figure 5:
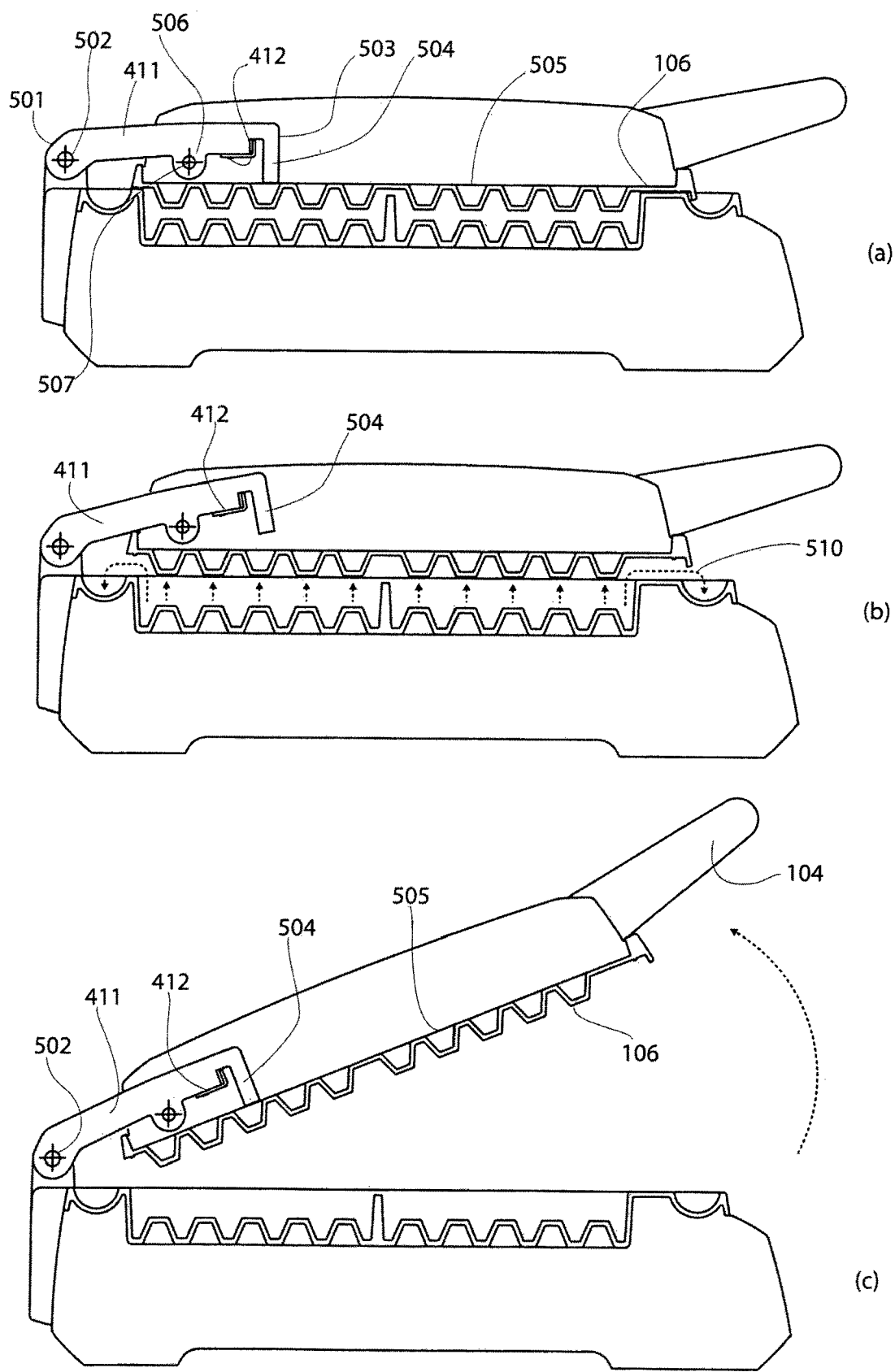

FIGS. 5 (a), (b) and (c) are cross sectional views of a waffle maker.

FIGS. 6 (a) and (b) are cross sectional details through a moat of a waffle maker.

FIG. 7(a) is a side elevation of a hinge component.

FIG. 7(b) is a top plan view of the device depicted in FIG. 7(a).

Figure 8E:
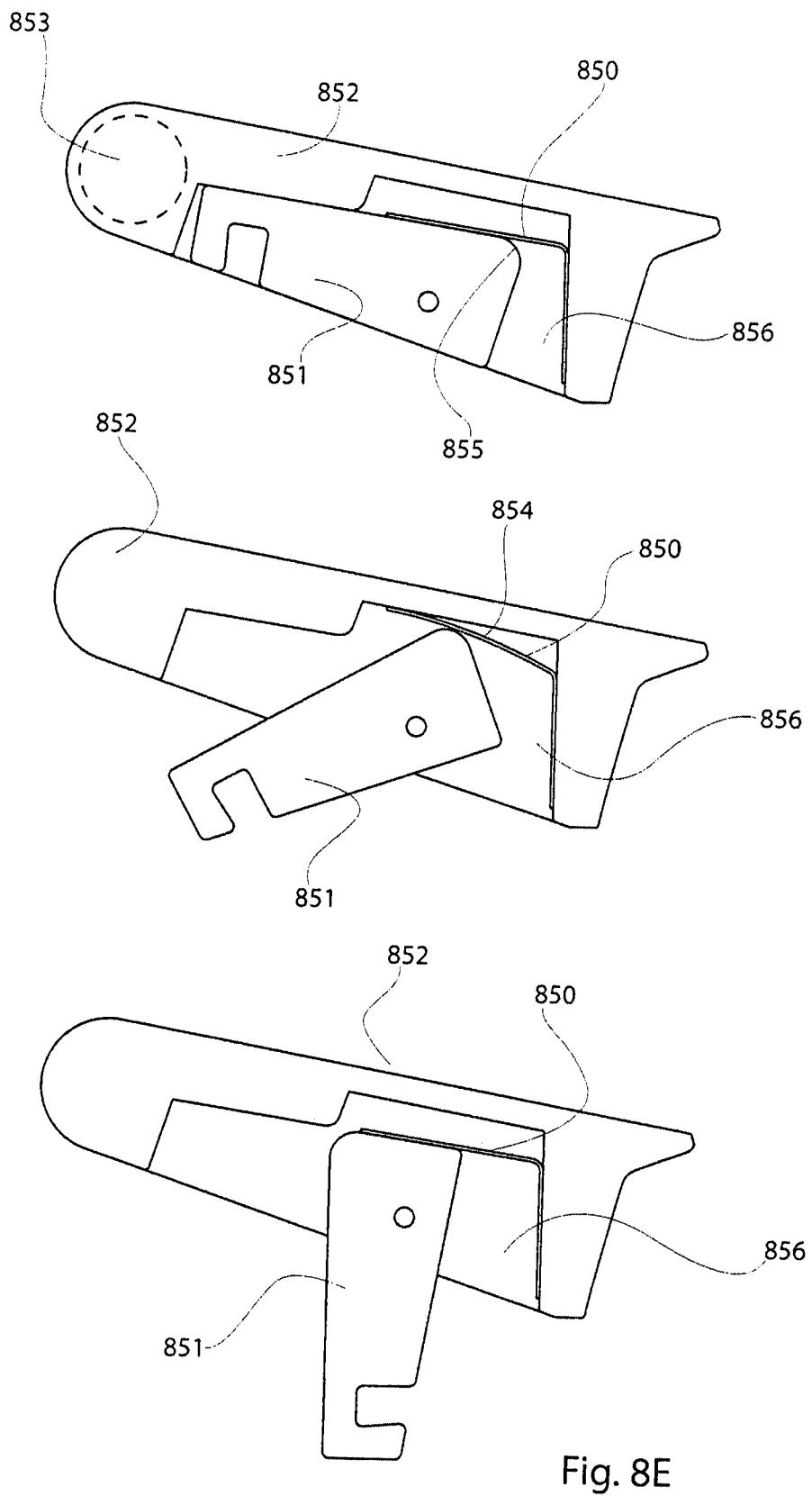

FIGS. 8 (a) and (b) are schematic cross sectional views of a handle and moat of a waffle maker.

FIGS. 8(c) and (d) are top plan views of the spring depicted in FIGS. 8(a) and (b).

FIG. 8A illustrates the operation of a locking latch contained within a handle of a waffle maker.

FIGS. 9(a) and (c) are side elevations of a handle and latch of a waffle maker.

FIGS. 9(b) and (d) are end elevations of a handle and latch for a waffle maker.

Figure 10:
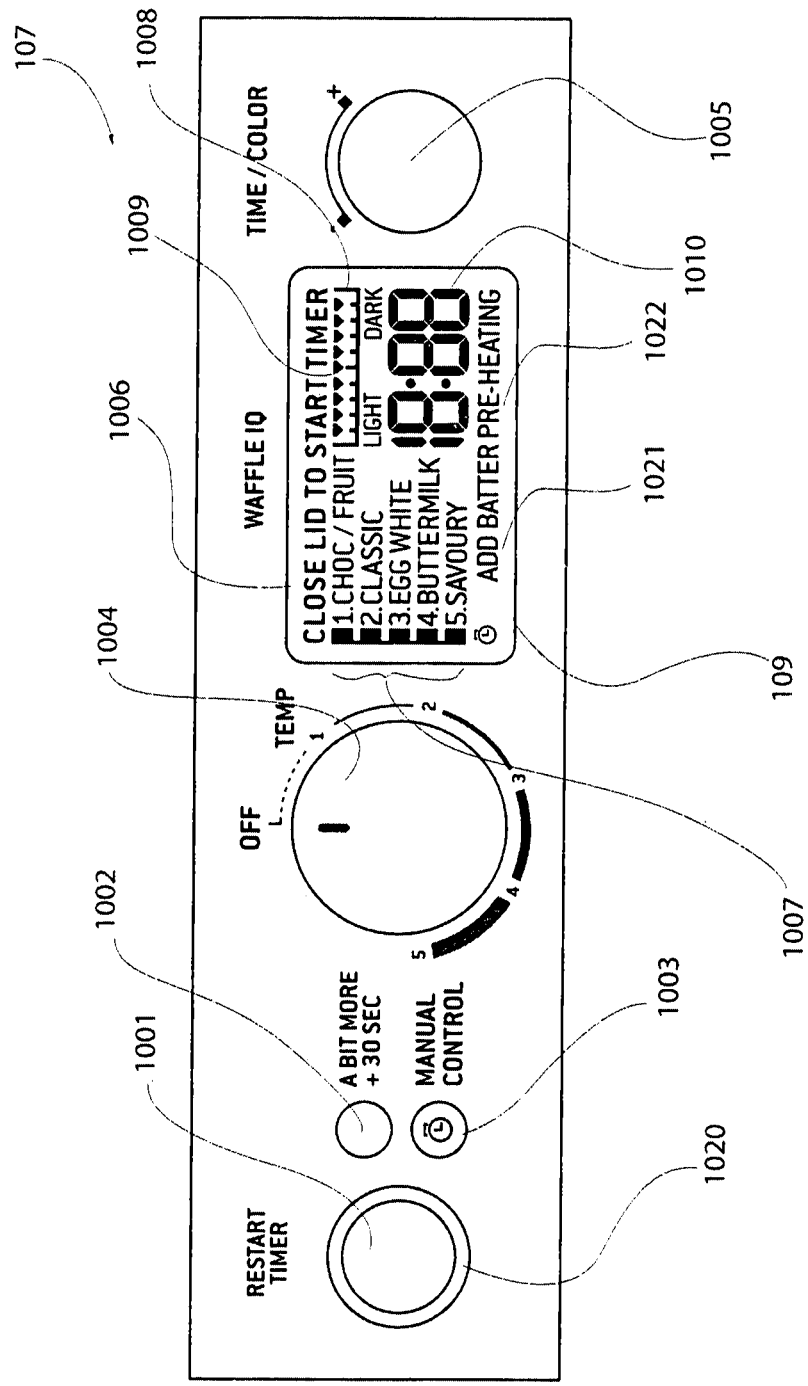

FIG. 10 is a front plan view of a user interface panel, the inputs and display associated with same.

Figure 11:
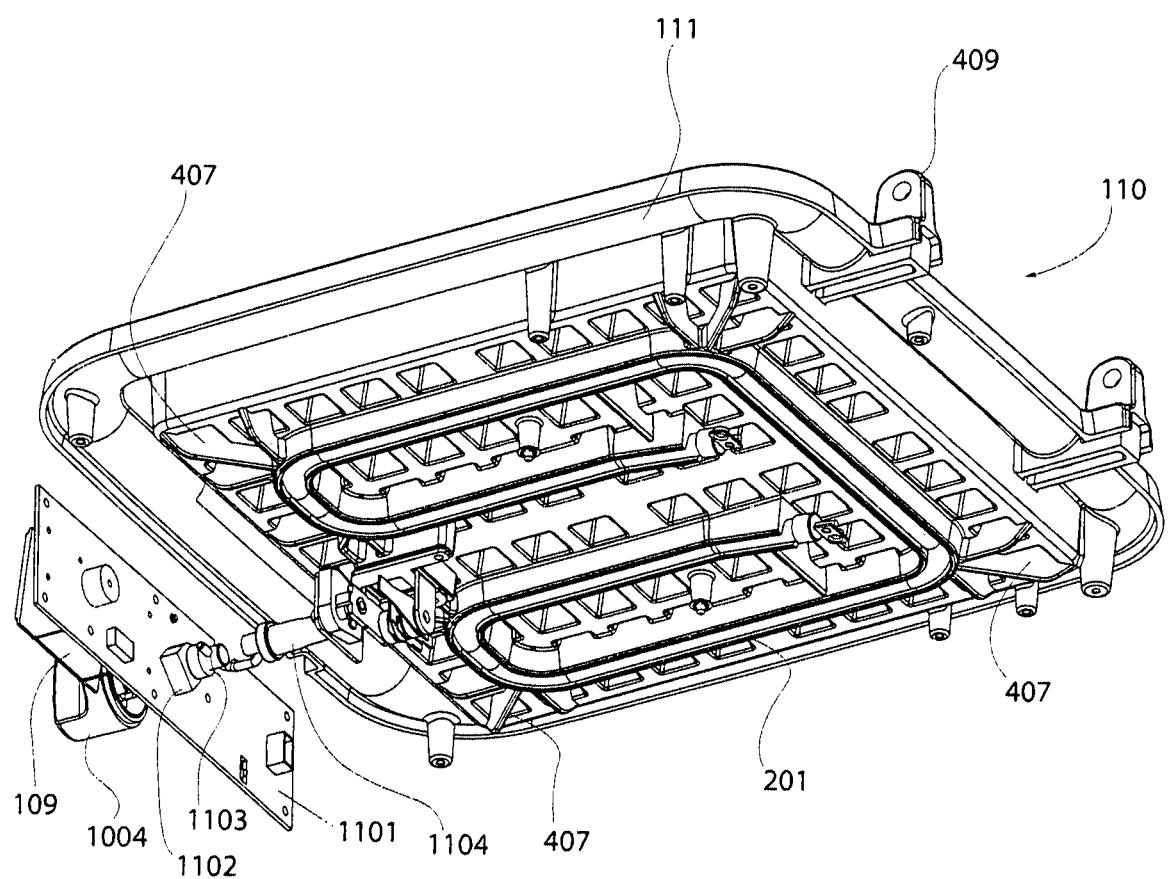

FIG. 11 is an underside perspective view of a lower waffle plate, thermostat and control.

Figure 12:
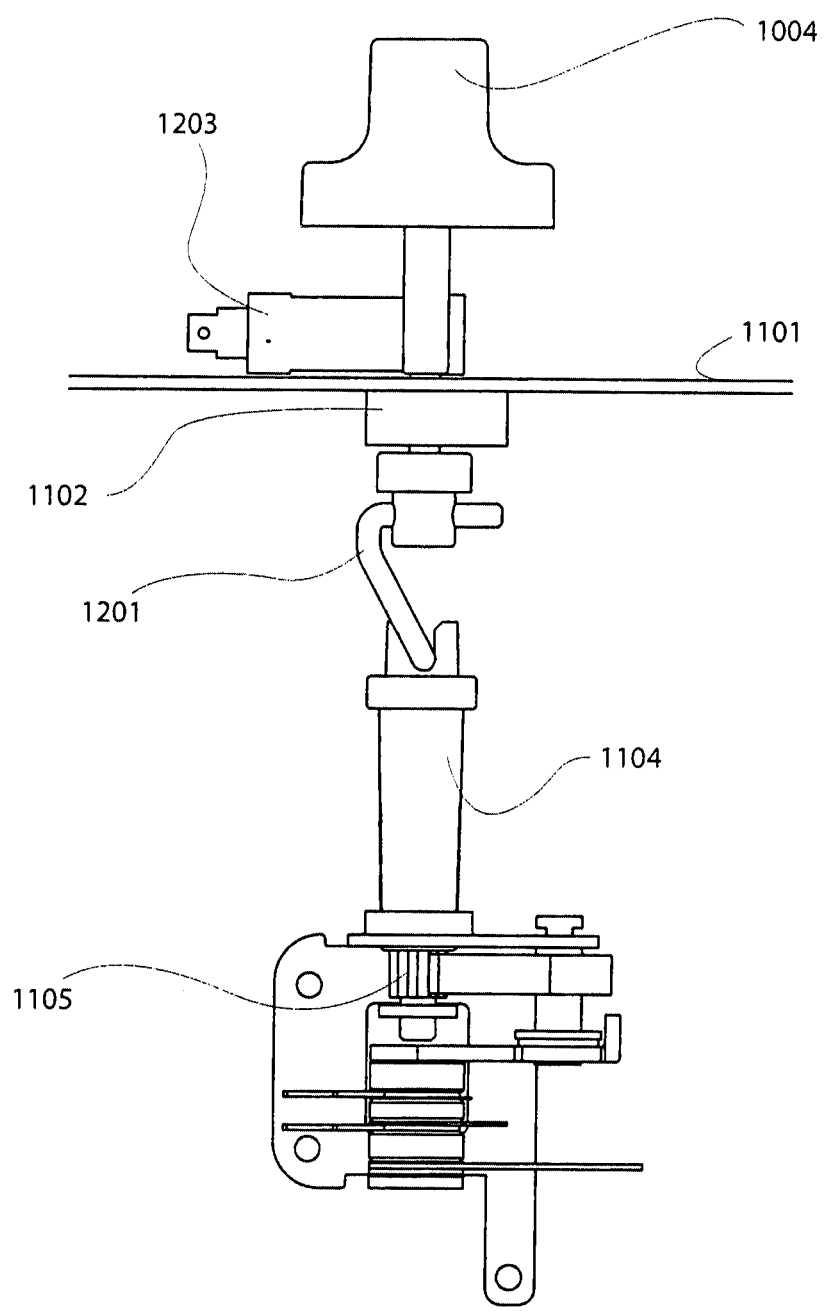

FIG. 12 is a top plan view of the control and coupling depicted in FIG. 11.

Figure 13:
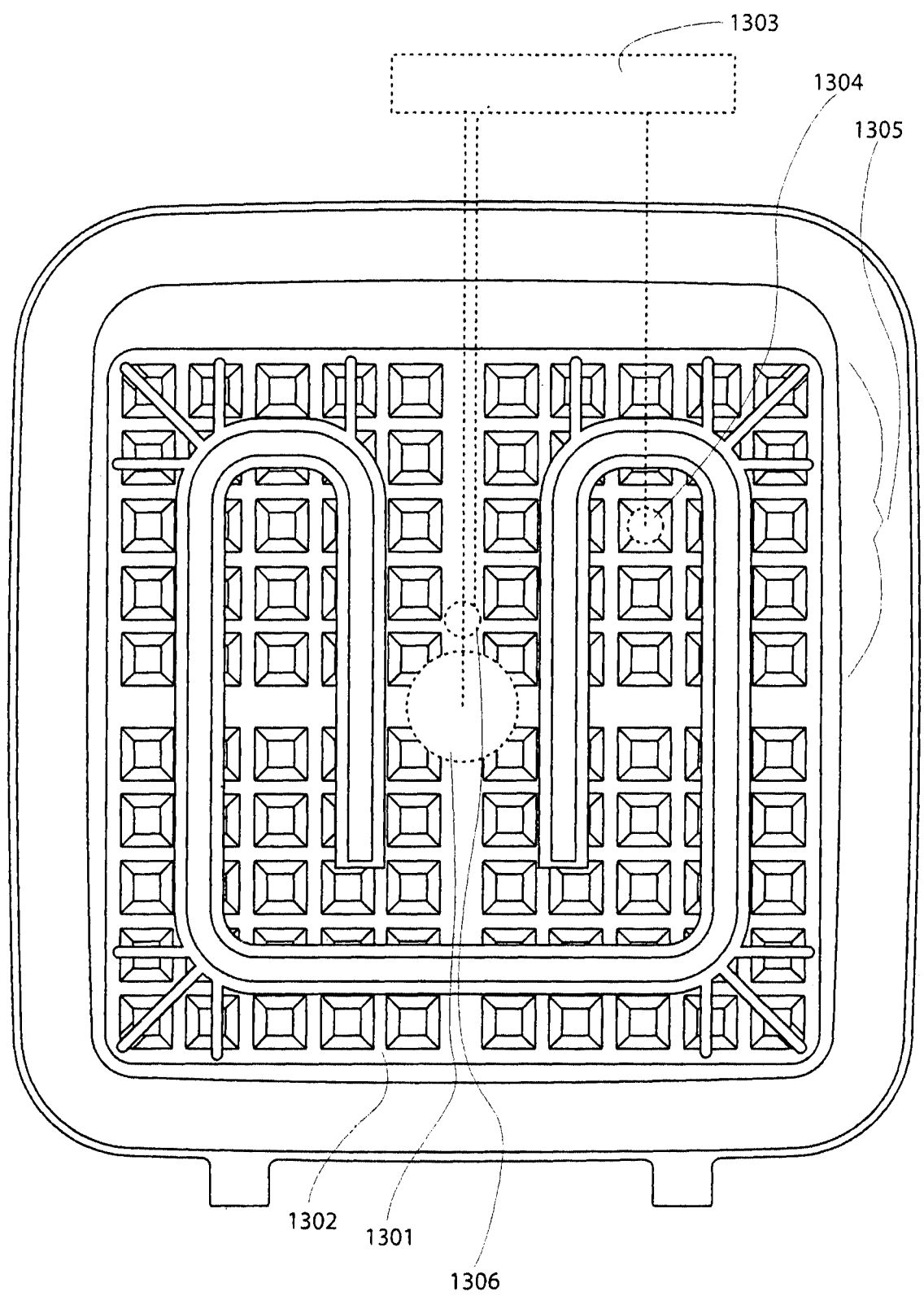

FIG. 13 is a plan view of the underside of a plate.

Figure 14:
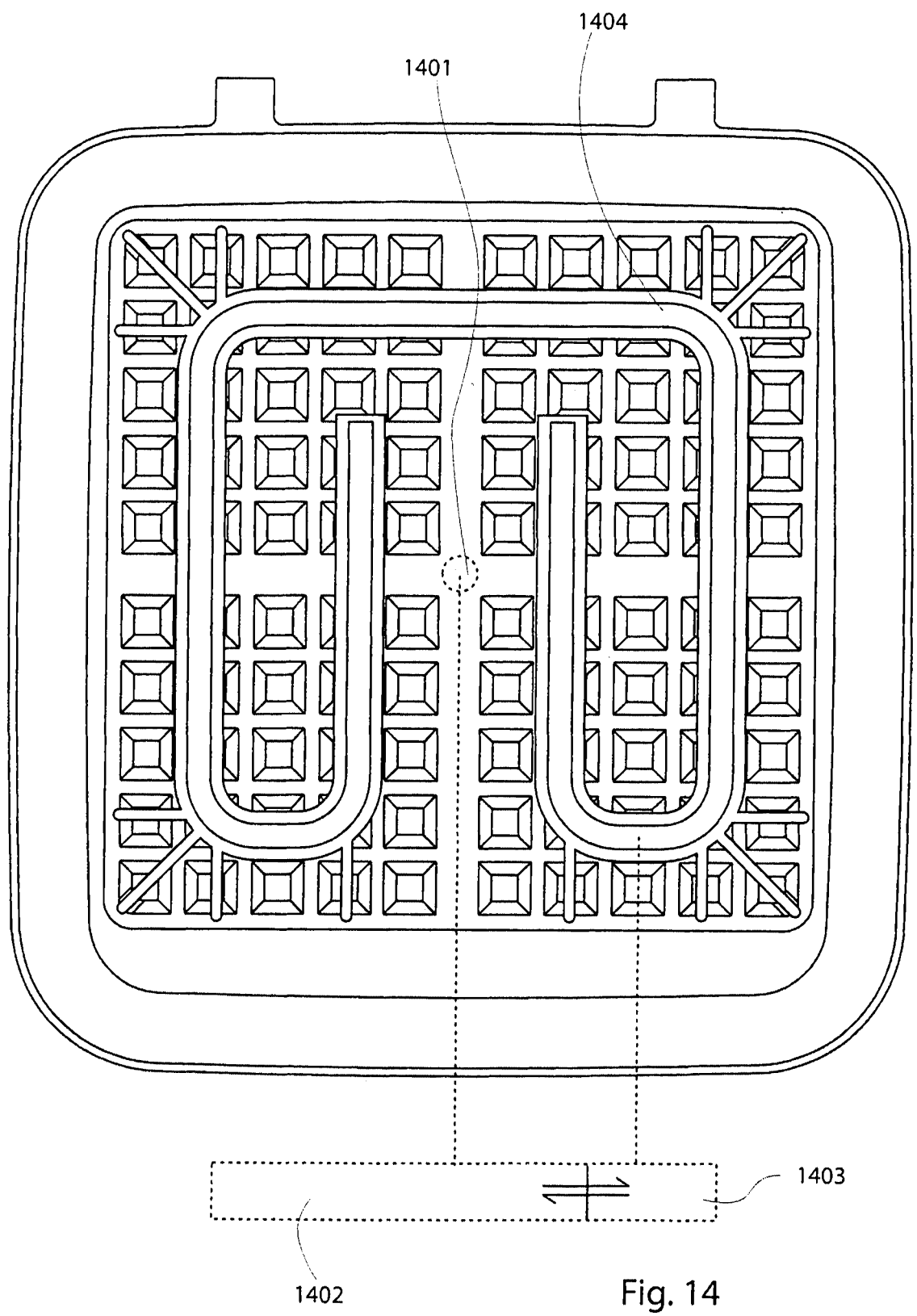

FIG. 14 is a plan view of the underside of a plate.

Figure 15:
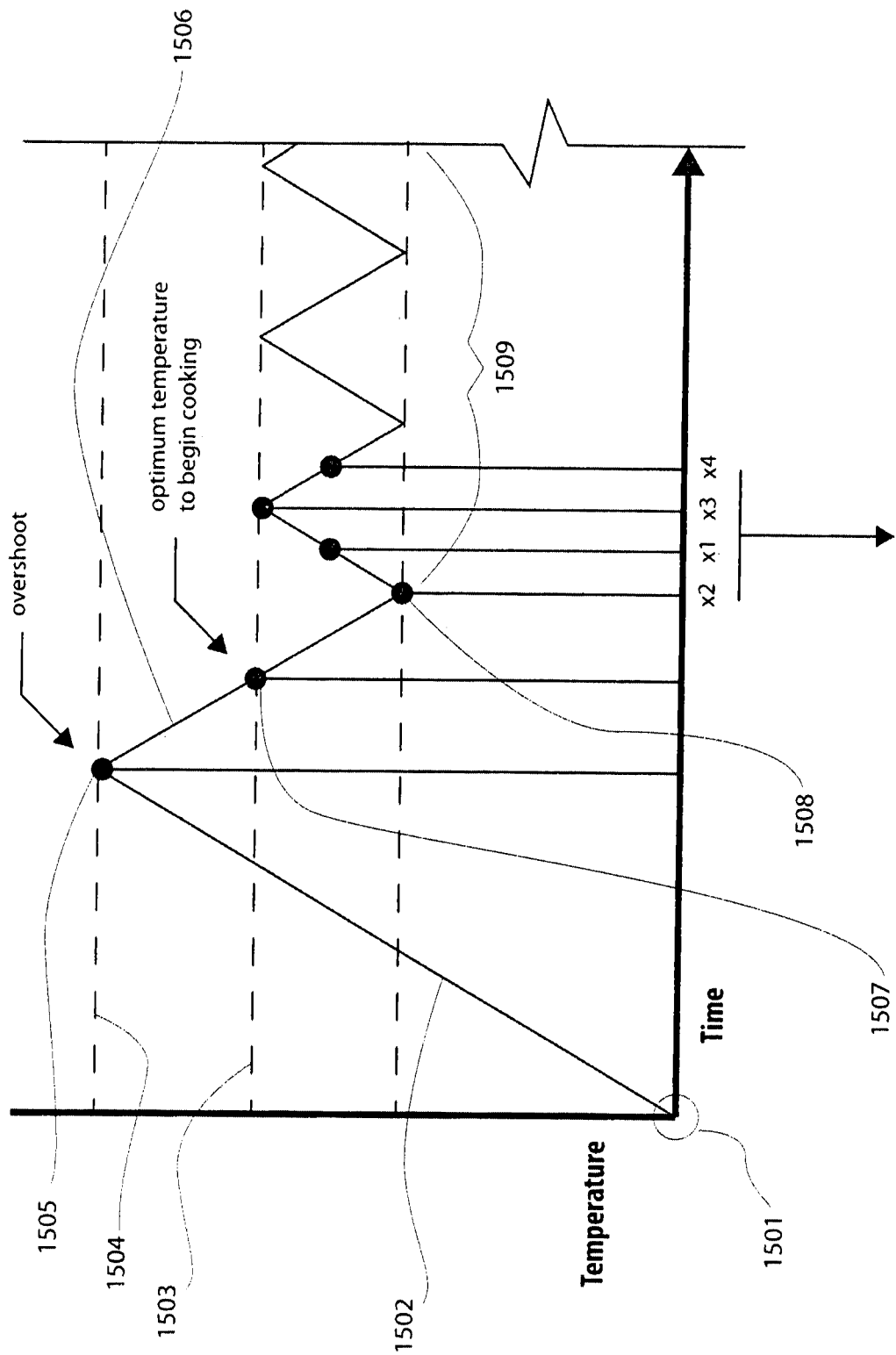

FIG. 15 is a graph illustrating temperature fluctuation in a plate of a waffle maker.

Figure 16:
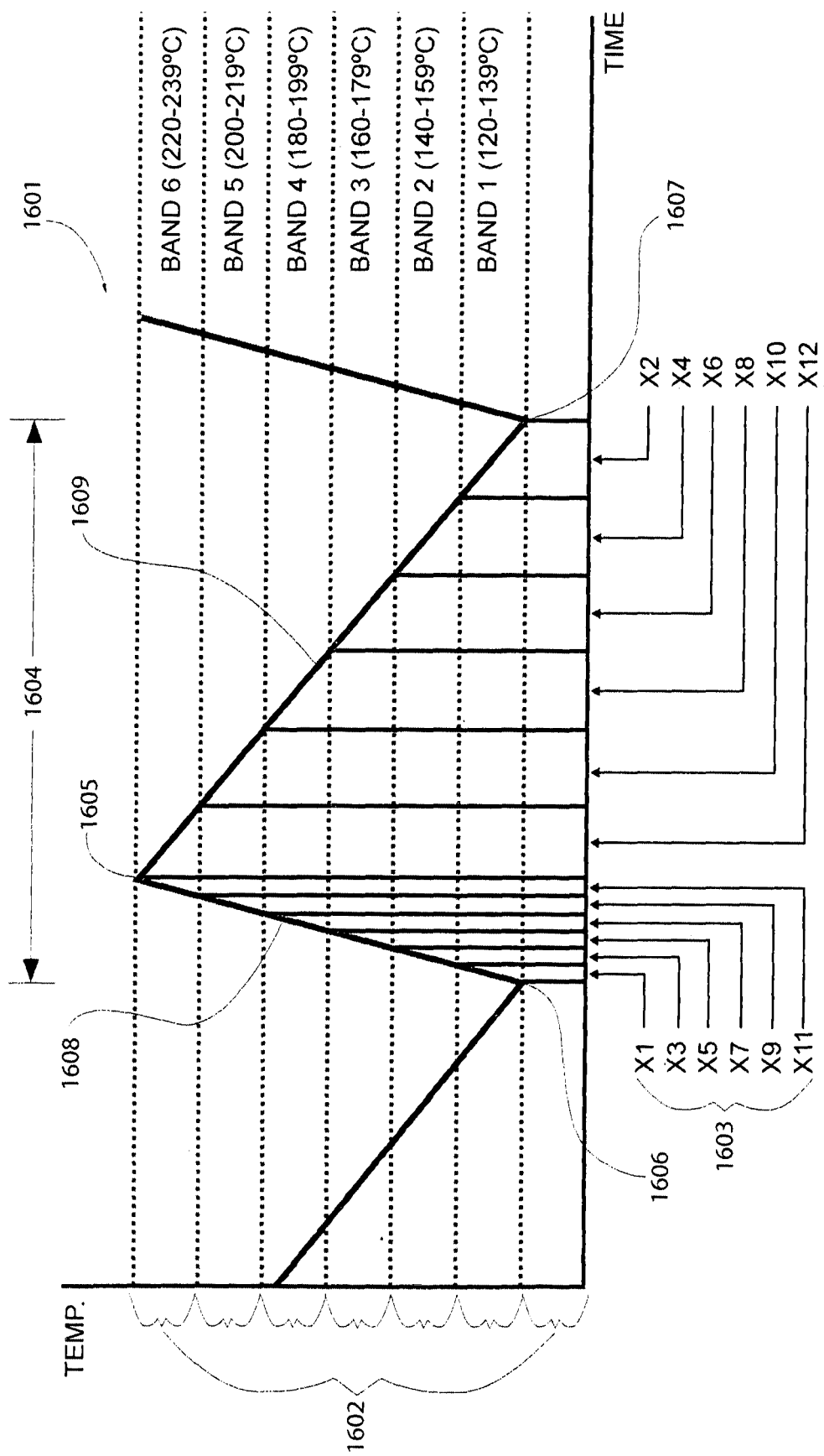

FIG. 16 is a graph illustrating the subdivision of temperature cycles in a waffle plate.

Figure 17:
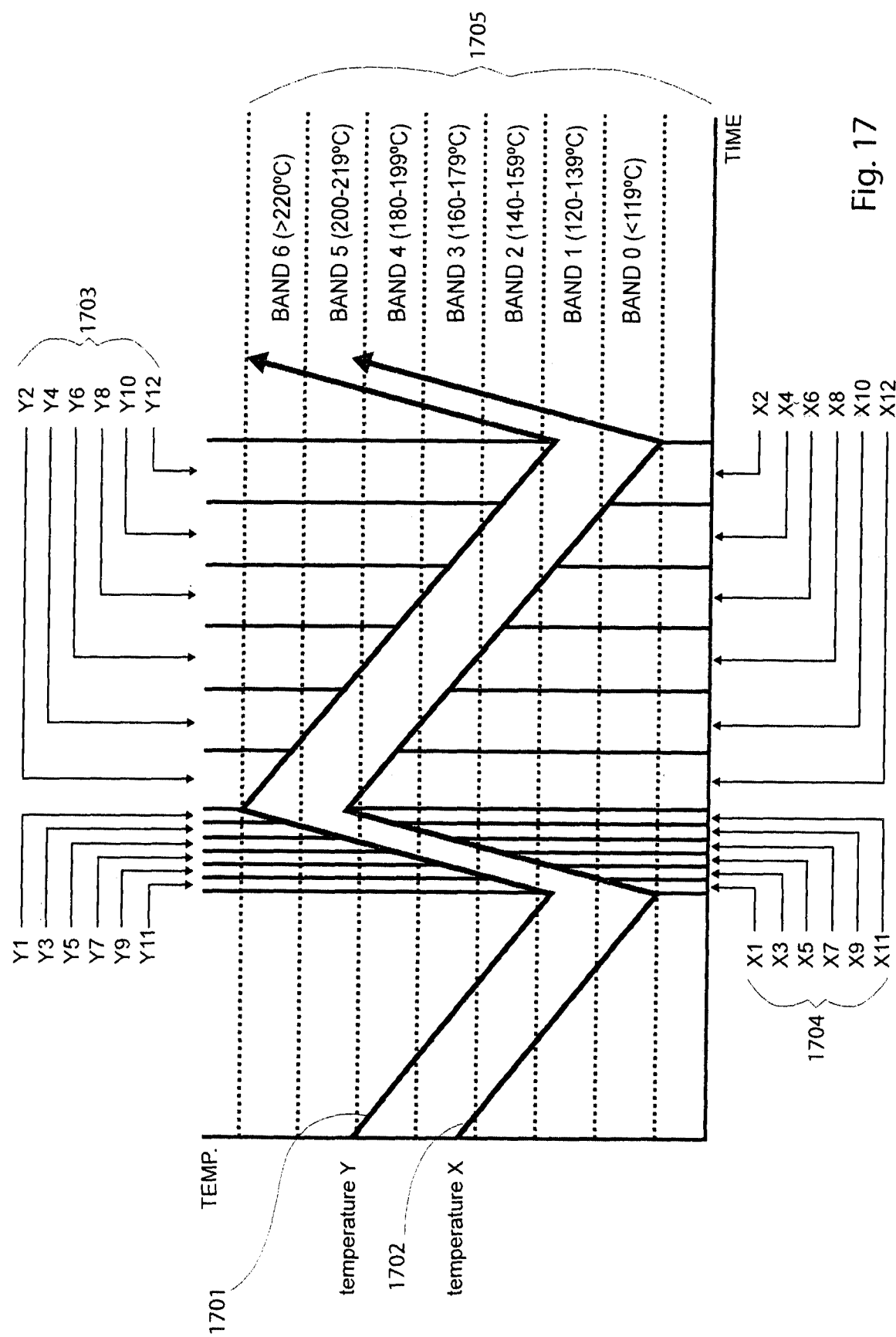

FIG. 17 is a graph illustrating the subdivision of temperature cycles in a variable temperature waffle maker.

FIG. 18 is a chart illustrating cooking time in accordance with various parameters associated with waffle making.

Figure 19:
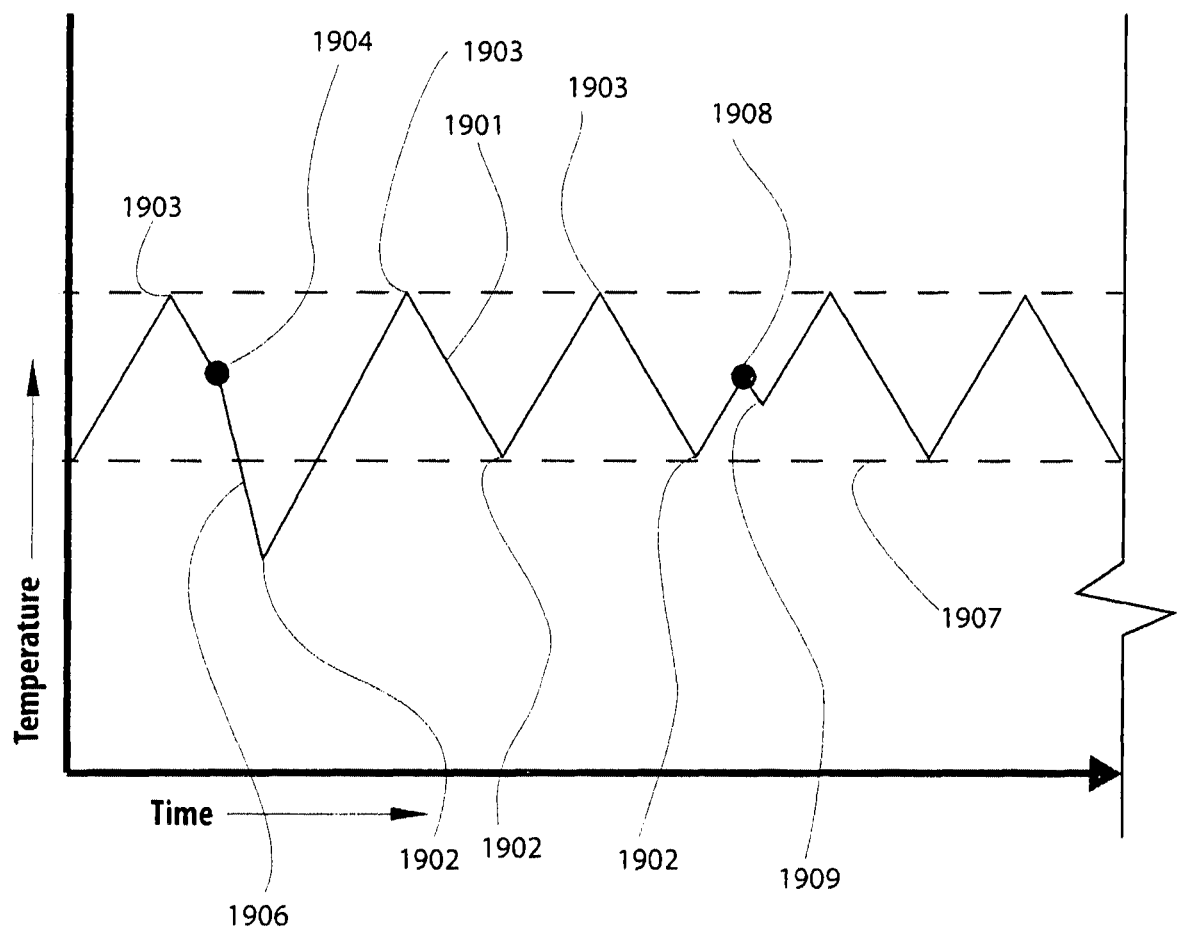

FIG. 19 is a graph illustrating temperature fluctuations of a cooking plate over time.

Figure 20:
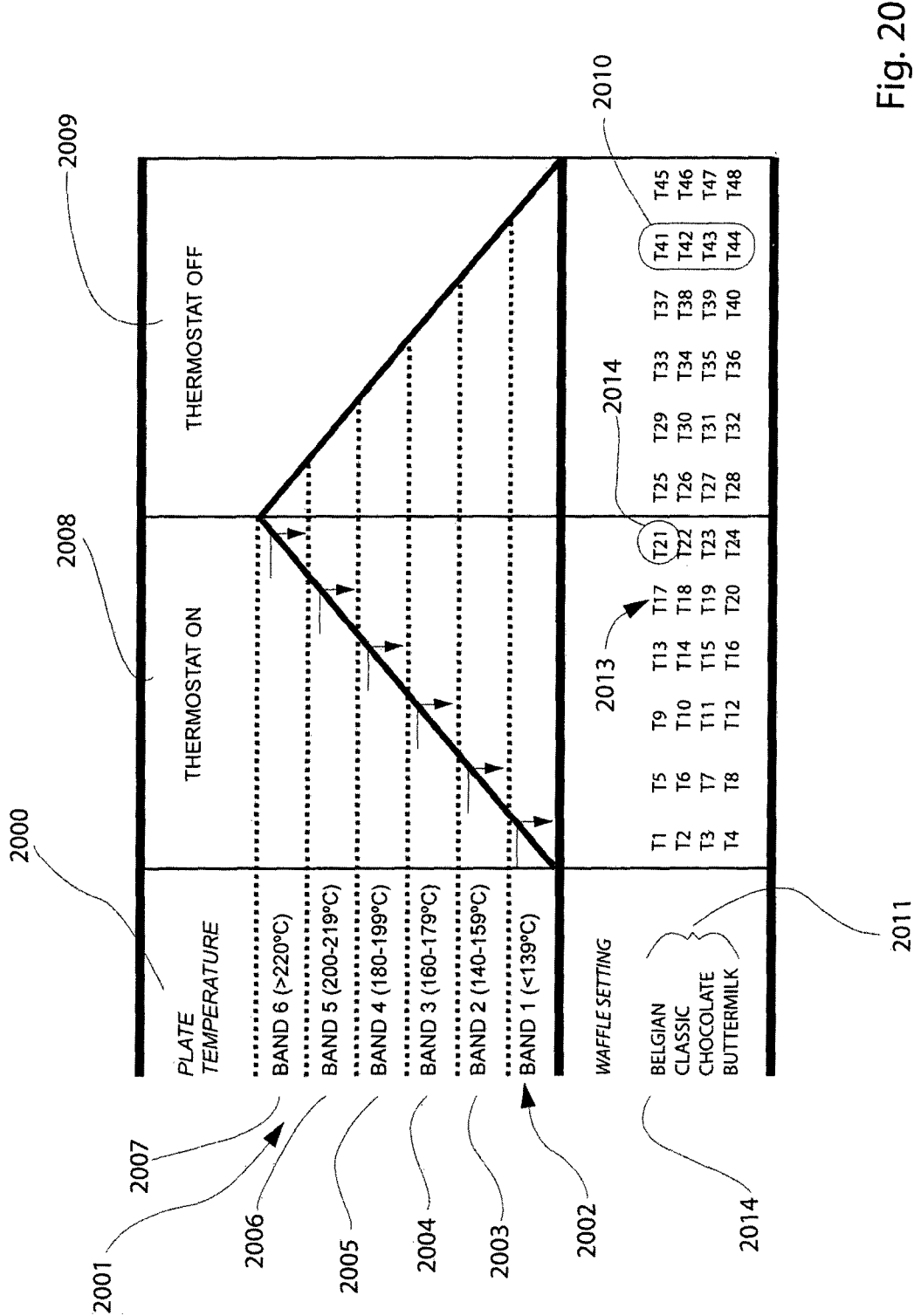

FIG. 20 is a chart illustrating symbolic time values in a look-up table, determined by various parameters including thermostat state.

Figure 21:
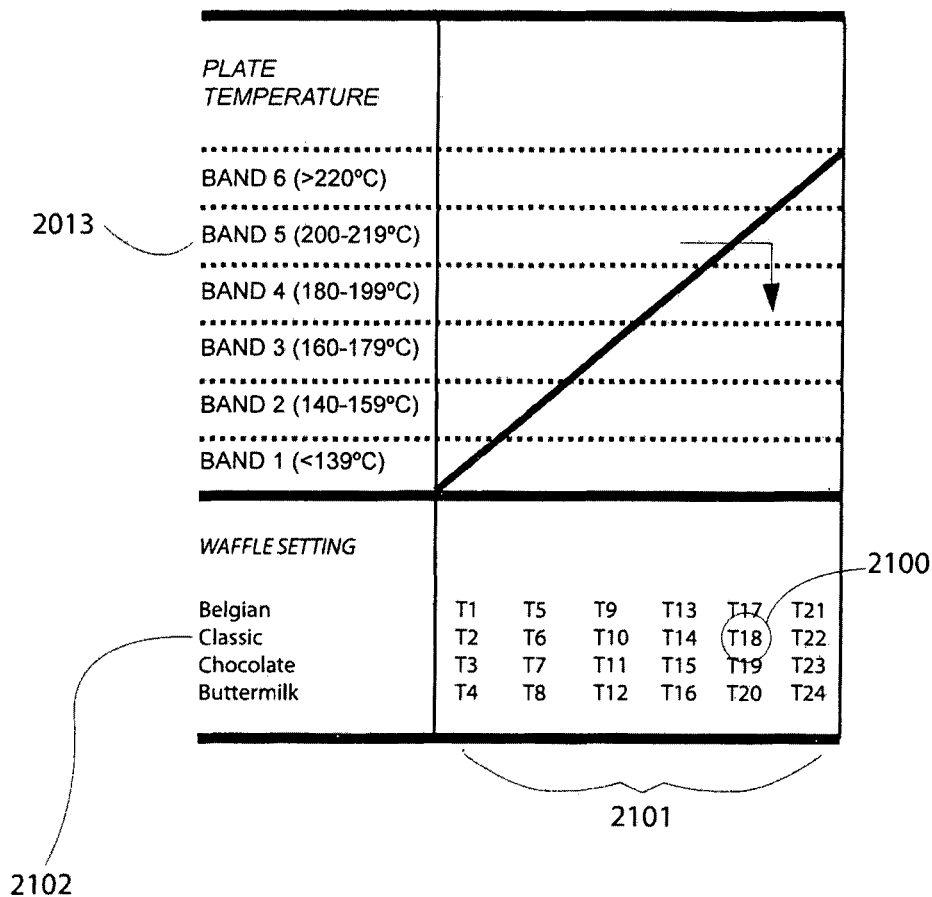

FIG. 21 is a chart illustrating symbolic look-up values of time in a device where cooking time is not based on a thermostat state.

FIG. 22 is a schematic representation of a user interface to a waffle making device.

FIG. 23 is a chart depicting cooking times for a Belgium waffle when batter is added while the thermostat state is "on".

FIG. 24 is a chart depicting cooking times for a Belgium waffle when batter is added while the thermostat state is "off".

FIG. 25 is a chart depicting cooking times for a Classic waffle when batter is added while the thermostat state is "on".

FIG. 26 is a chart depicting cooking times for a Classic waffle when batter is added while the thermostat state is "off".

FIG. 27 is a chart depicting cooking times for a Buttermilk waffle when batter is added while the thermostat state is "on".

FIG. 28 is a chart depicting cooking times for a Buttermilk waffle when batter is added while the thermostat state is "off".

FIG. 29 is a chart depicting cooking times for a Chocolate waffle when batter is added while the thermostat state is "on".

FIG. 30 is a chart depicting cooking times for a Chocolate waffle when batter is added while the thermostat state is "off".

Figure 31:
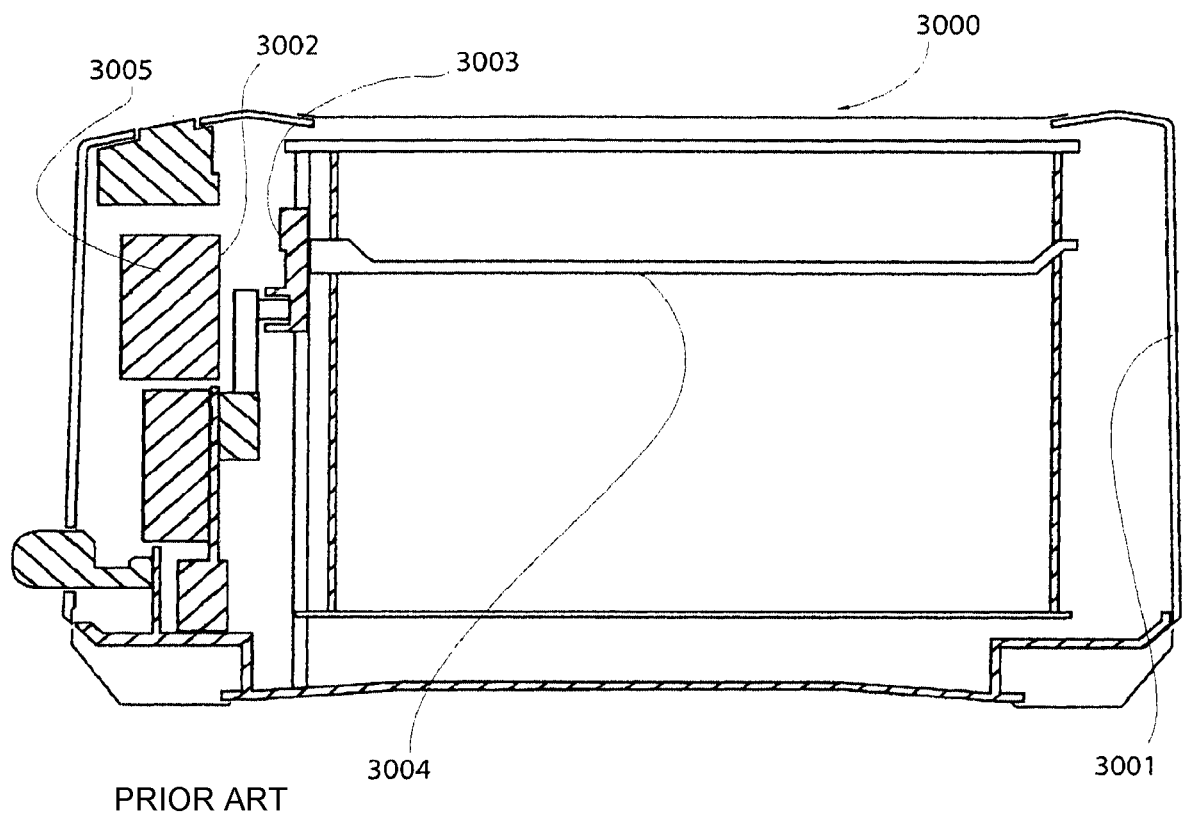

FIG. 31 is a cross sectional view of a toaster.

Figure 1:
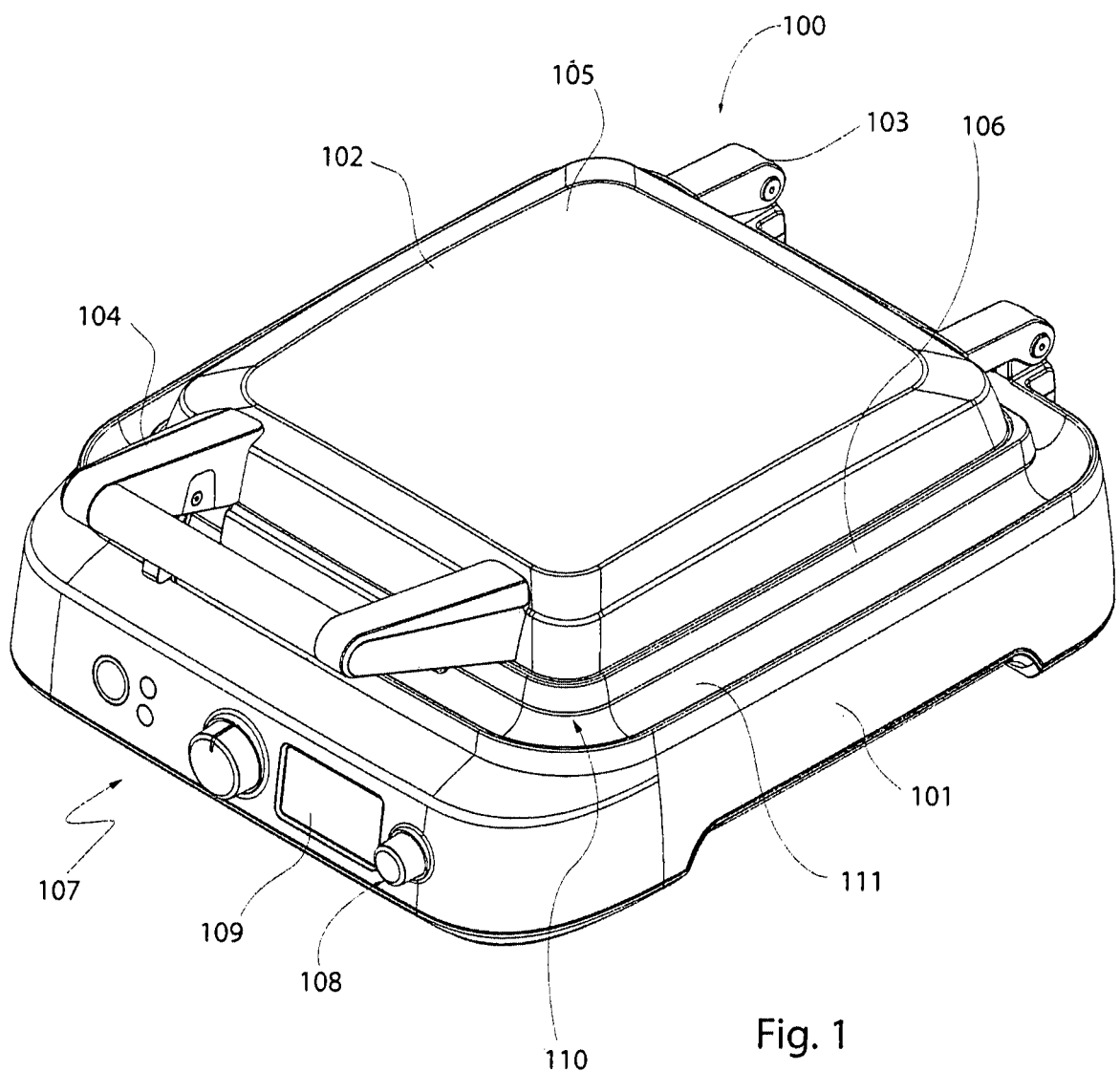
FIG. 1 is a perspective view of a waffle maker.
Figure 32:
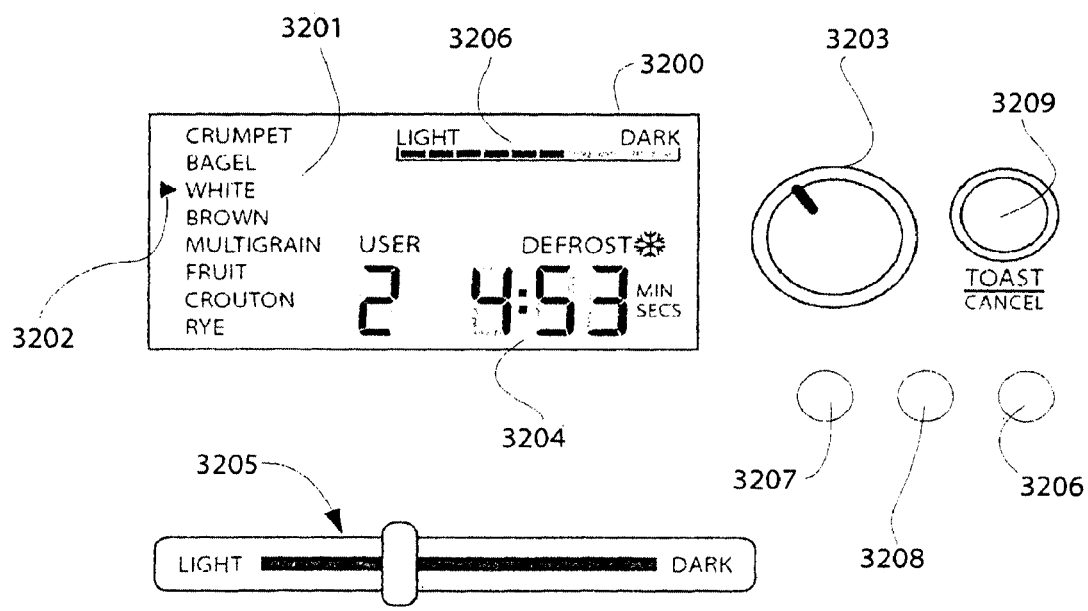

FIG. 32 is a representation of a user interface to the toaster depicted in FIG. 1.

Figure 33:
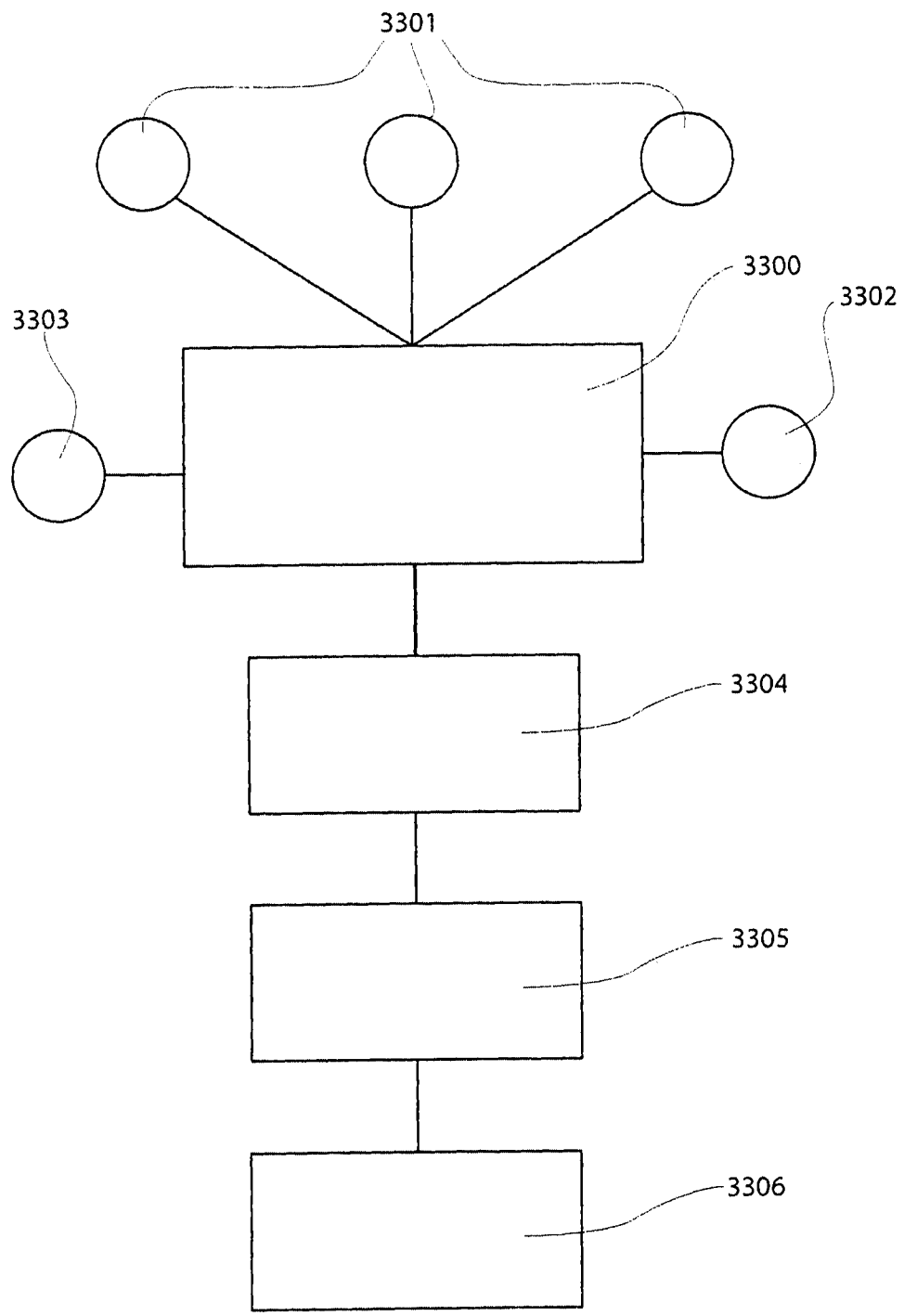

FIG. 33 is a flow chart illustrating a method for preparing cooked foods.

BEST MODE AND OTHER EMBODIMENTS

As shown in FIG. 1, a waffle maker 100 comprises a base or lower housing 101 that is connected to an upper housing 102 by a pair of hinges 103. The upper housing 102 incorporates a forward facing "U" shaped handle 104 and upper cover 105 and an upper metal cooking plate 106. The base or lower housing 101 incorporates a user interface 107 having the user inputs or controls 108 necessary to operate the unit as well as one or more luminous indicators, multi-colour backlit and an alpha-numeric display 109. The lower housing supports the lower cooking plate 110. The lower plate 110 has a circumferential moat in that forms a continuous channel for receiving batter overflow and spillage.

Figure 2:
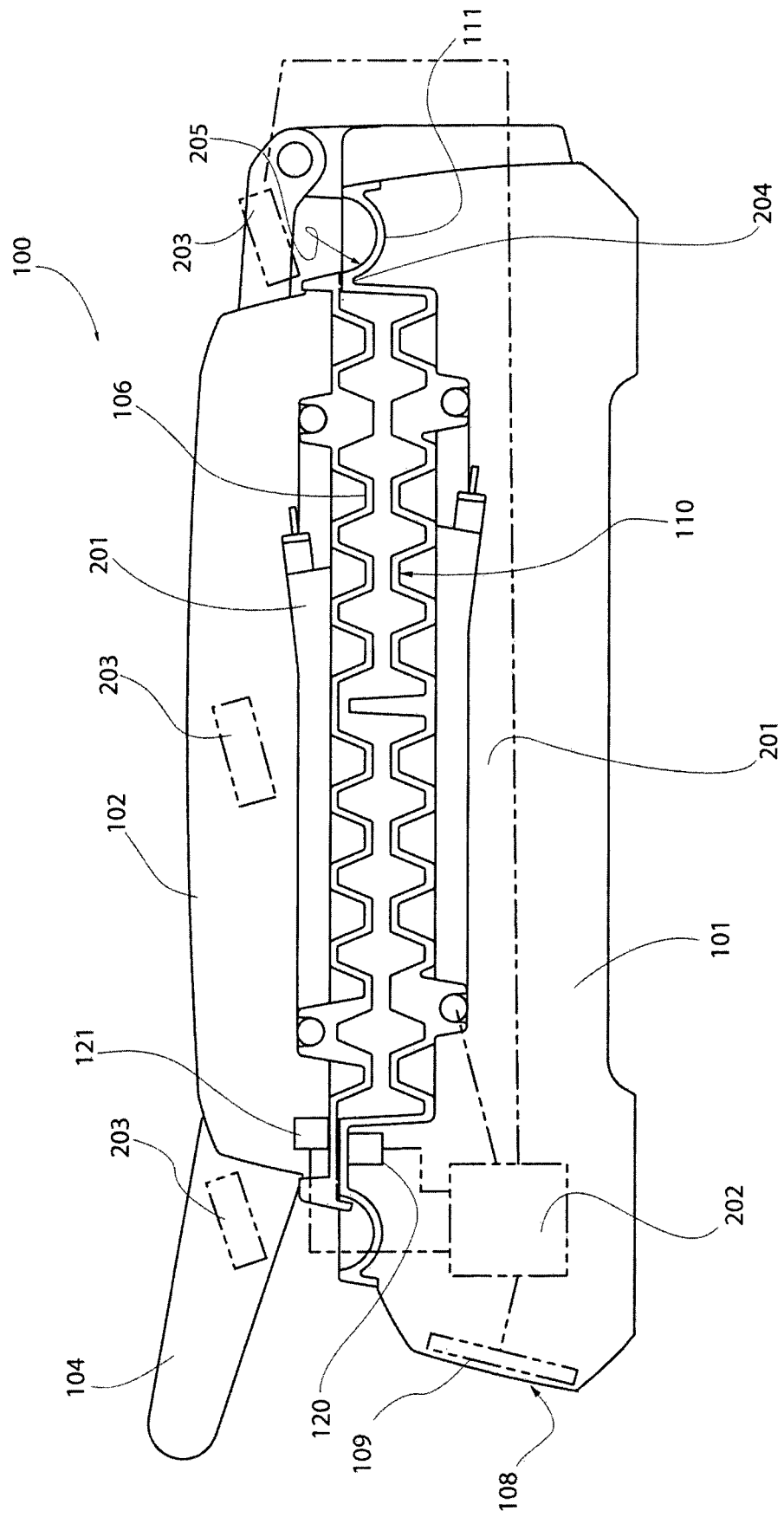
FIG. 2 is a cross section through the device depicted in FIG. 1.

As shown in FIG. 2, the purpose of the upper and lower housings 101, 102 is to bring together with upper and lower crenelated plates 106, 110. Each of the plates includes a heating element 201. The power to the heating element is controlled by an MCU, a thermocouple and relay arrangement, microprocessor, fixed or variable thermostat or other control device such as combinations of the aforementioned devices 202 (hereinafter "controller"). The controller 202 also receives inputs from the user interface 108 and drives the display 109. In preferred embodiments, the waffle maker 100 also includes a tilt or level sensor 203 that supplies information to the MCU 202 about the state of the upper housing 102. Because of the heating elements, the level sensor is preferably located within the handle 104. The level sensor or 203 switch such as a microswitch is capable of detecting when the upper housing 102 is opened or closed and can transmit this information or signal to the MCU 202. The signal may be used to indicate the start of a cooking interval. The position of upper housing 102 may also be determined with a mechanical switch or sensor 120 located in the lower housing or a switch or sensor 121 located in the upper housing. The switch or sensor 120, provide a signal to the MCU that indicates when the upper housing is opened or closed. The MCU then causes the entire display to change from one colour to another when the waffle maker 100 is operational and closed. The information may also be used to start the timer or count-down timer.

The lower plate 110 incorporates an integral, peripheral moat 111. In preferred embodiments, the moat 111 is continuous and formed adjacent to the outer rim of the lower plate where the upper and lower plates come together 204. When pouring or heating waffle batter, excess will flow over the rim 204 and into the moat 111. When compared with other waffle makers, the moat depicted in FIG. 2 is large, having a volume ratio (when compared to the batter volume of a waffle) of 1:4.9 or more, with a lower practical limit of about 1:10. In preferred embodiments, the internal radius 205 of the moat 111 is at least 5 mm and up to 11 mm or larger. The preferred shape of the moat is essentially or approximately a section of a circle.

Figure 3:
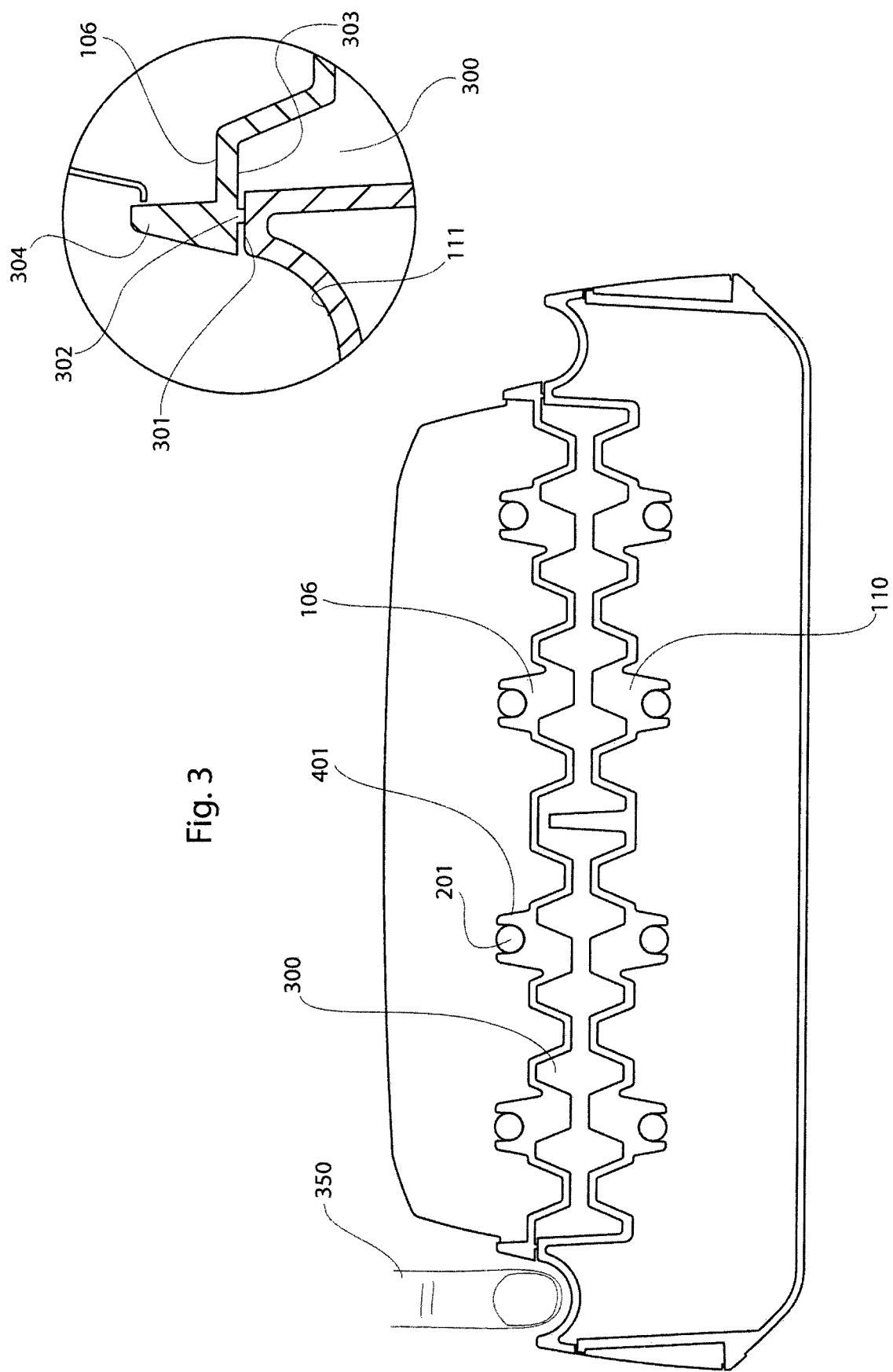
FIG. 3 is a cross section through a waffle maker and its moat.

As shown in FIG. 3, the upper and lower plates 106, 110 are capable of forming a cavity 300. The cavity 300 has edges. The cavity edge of the lower plate 110 is formed by a short horizontal shoulder 301 located between the cavity 300 and the moat 111. Batter that escapes over the edge 301 is captured in the moat 111. Note that the size and shape of the moat 111 are such as to conform to the size and shape of an adult human finger 350. This assists with cleaning spilt batter from the moat both during and after cooking has occurred and the unit has cooled. The cavity edge of the upper plate 106 is formed by a downward facing rectangular rim or bead 302 formed on a horizontal surface 303 around the periphery of the upper plate 106. The bead may be on the lower plate and upward facing. The continuous peripheral bead 302 serves to increase the contact pressure between the two respective edges. This serves to better separate the interior of the cavity 300 from any batter that is located in the area of the edge 301 or outside of it. The upper plate 106 has a peripheral and upstanding rim 304 that is preferably located above the bead 302.

Figure 4:
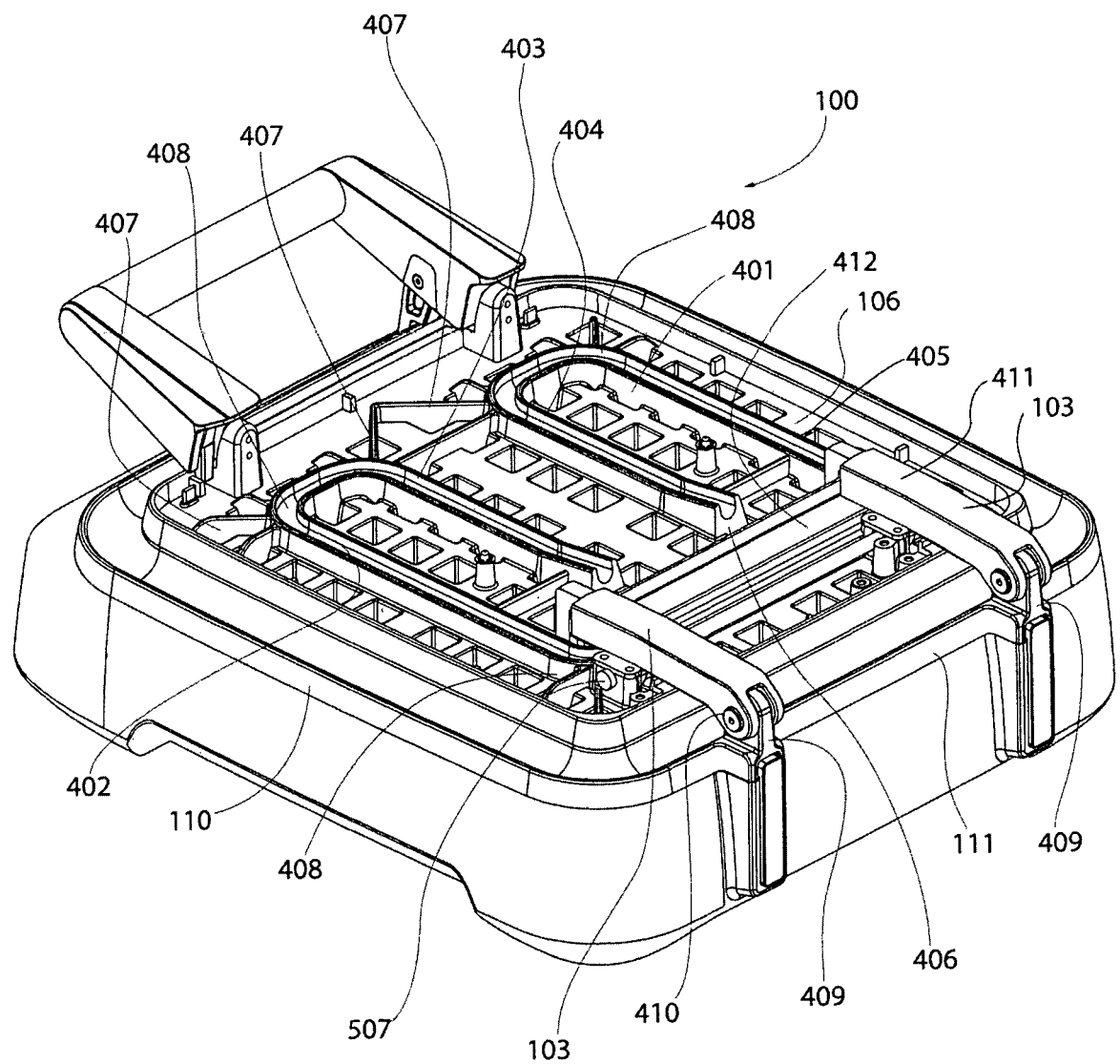
FIG. 4 is a perspective view of a waffle maker with a top cover removed.

FIG. 4 illustrates, in perspective view, the waffle maker 100 with the top cover 105 removed. This view illustrates the double interconnected "U" shaped path for the upper heating element 201 that is created by a raised channel 401. The channel is cast into the back face of the upper plate 106. The channel is continuous and having, for example, four approximately equally spaced limbs 402, 403, 404 and 405. The open ends of the channel 406 face the rear of the upper plate. The open ends 406 are found on the two inner limbs 403, 404. The outer limbs 402, 405 connect to one another behind the open ends 406 (with reference to the rear of the waffle maker; see FIG. 11). The channel 401 has integral ribs 407 that radiate away from it, particularly in the areas of the rounded corners 408 that join the various segments of the channel. These integral ribs 407 assist in transferring heat from the heating element and its channel to the more remote regions of the lower plate so as to achieve a more uniform heating.

FIG. 4 also illustrates the construction of the parallel hinges 103 that interconnect the upper and lower housings. Each of the lower hinge elements 409 is moulded into the lower plate 110, outside of or behind the periphery of the moat 111. A hinge pin 410 joins each of the lower hinge elements 409 to an upper hinge element 411. The pivot or pin 410 is preferably located above the level of the moat to prevent being fouled by batter. The two elongated upper hinge elements 411 are interconnected by a transverse rigidising "L" shaped bracket 412 or formed as a single unit. Further details of the hinge arrangement are depicted in FIG. 5.

As shown in FIG. 5(a) and upper hinge element 411 has a rear end 501 in which is formed a hinging area, being in this example an opening 502 for the hinge pin 410. The forward end 503 of the hinge element 411 comprises a downward extending finger 504. As suggested by FIG. 5(a), when the upper and lower plates are brought together in a fully closed orientation, a lower and preferably flat end of the finger 504 makes contact with the interior and upper surface 505 of the upper plate 106 (being a part of the upper housing). An intermediate hinge point 506 is formed on the upper hinge element between the rear end 501 and the finger 504. In this example, the intermediate hinge point 506 comprises of an opening that surrounds a transverse shaft 507 that is supported above and retained by a saddle to the upper surface 505 of the upper cooking plate 106. Thus, the upper hinge elements 103 pivot in two locations. At a first location 502 or rear pivot, the upper hinge element 103 pivots with respect to the lower housing. At a second or intermediate location or area 507 the hinge element pivots with respect to the upper housing. Because of this geometry, the upper housing "floats" or can be displaced upwardly in a way that is essentially parallel with respect to the lower housing of base. This is depicted in FIG. 5(*b*). Displacement of this kind occurs, for example, as the batter is heated and expands. The pressure between the upper and lower plates is essentially uniform and overflow 510 escapes the gap between the two plates and enters the moat. As illustrated in FIG. 5(*c*) when the front handle 104 is used to open or pivot the upper housing, the upper surface 505 of the upper plate 106 contacts the lower end of the finger 504. This limits the inclination or movement of the upper housing with respect to the upper hinge element. Thereafter pivoting can only occur at the rear most hinge point 502 as the unit is opened.

As shown in FIGS. 6(*a*) and 6(*b*), the extent of the parallel separation between the two plates caused by the expanding batter (see FIG. 5(*b*) may be limited. As suggested by FIG. 6(*a*) a contact bumper 601 may be formed above the upper surface 505 of the upper plate 106 in an area rearward of the intermediate hinge point or hinge area 507. Note that in FIG. 6(*a*) there is a small gap 602 between the upper tip of the bumper 601 and the lower surface of the hinge element 103. The gap 602 is at its maximum when the two plates are brought together and in contact with one another. In effect the gap 603 between empty upper and lower plates is zero. As shown in FIG. 6(*b*), as the upper and lower plates move apart from one another, the gap 602 between the bumper and the upper hinge element 103 is reduced until the bumper 601 actually contacts the underside of the hinge element 103. Thus the gap 602 is reduced to zero as the plate gap 603 reaches its maximum. Further upward movement of the upper plate is then hindered.

Figure 7:
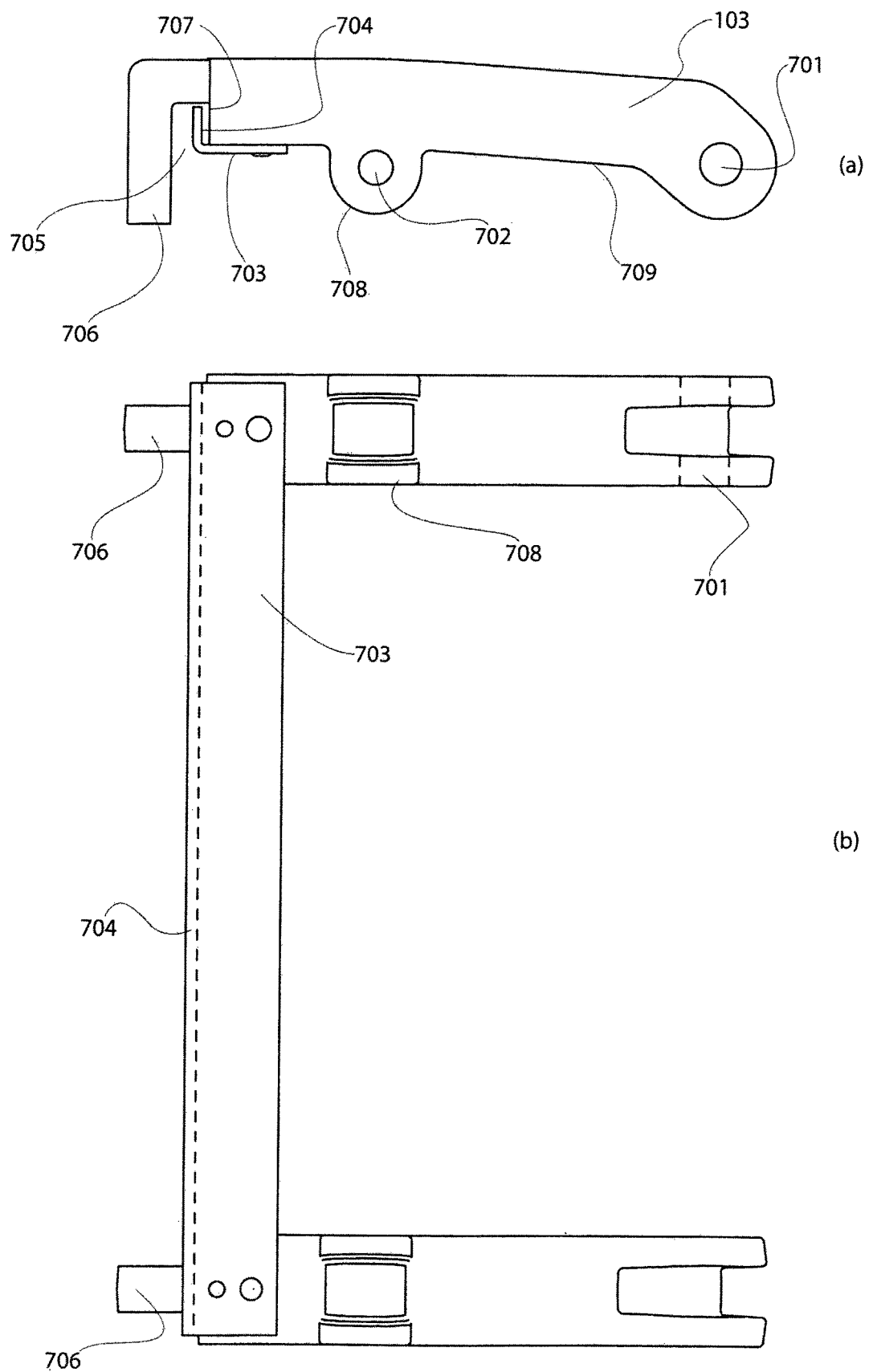

A more detailed view of the upper hinge element 103 is shown in FIGS. 7(*a*) 7(*b*). The hinge element 103 comprises a unitary limb having a rear pivot location 701 and an intermediate pivot location or area 702 as previously discussed. An "L" shaped bracket 703 interconnects the left right hinge elements 103. In preferred embodiments, the shorter and upwardly directed edge 704 of the bracket 703 rests within a gap that is located between the downward extending finger 706 and a flat forward facing surface 707 of the hinge element body. The intermediate hinge point or opening 702 is formed in a lobe 708 that extends from the underside 709 of the hinge element body.

As shown in FIG. 8, storing and transporting the waffle maker 100 is facilitated by a pivoting mechanical lock that selectively connects the upper housings handle 104 to an outside edge 801 of the overflow moat 111. As suggested by FIG. 8, by way of example, an outside surface 802 of one or the handle's side pieces 803 may contain a pocket of cavity 804 for receiving a bi-stable pivoting clip or lock 805. The lock is attached to the handle by a central pivot point 806 and moves from a concealed orientation depicted in FIG. 8(*b*) to an extended orientation as shown in FIG. 8(*a*). In the extended orientation, the hook-like body of the lock is adapted to engage below or with an overhang or rim 806*a* that surrounds at least that part of the moat that lies below the handle 104. The edge 801 of the moat lies within a recess 805 in the lock body. In this way, no part of the lock body 805 enters the moat 111 or interferes with it. The pivoting lock body 805 is stable in both of the positions illustrated in FIG. 8(*a*). This is accomplished by using a resilient wire spring shaped in the manner depicted in FIG. 8. The spring 809 is stable in those two orientations but can to bias the lock body into the retracted orientation depicted in FIG. 8(*b*) once dislodged from the locked orientation. The spring comprises a first free end 810 that is inserted into an opening 811 in the lock body. The spring has a central loop 812 for added resiliency and a terminal loop 813 for affixation.

As shown in FIG. 8A a pivoting mechanical lock that functions similarly to the one discussed with reference to FIG. 8 may utilise a leaf-spring 850 instead of a resilient wire spring. Both the leaf-spring 850 and the pivoting lock body 851 are concealed within one of the pair of side pieces 852 that are used to support the cross bar 853 of the device's handle 104 in this example, a leaf type spring 854 is deflected by the rounded corner 855 of the pivoting lock body and has two stable positions. One position conceals the rotating lock body within a recess 856 in the side piece and the other orientation locates the lock body 851 in an extended position in which it protrudes from the recess 856 and is adapted to engage either an edge of the lower cooking plate or a portion on or associated with the lower housing.

As shown in FIGS. 9(*a*)-(*d*), the side pieces 901 of the handle 104 may have a pocket for concealing the pivoting, retractable lock body 902. In preferred embodiments, the lock body 902 further comprises a lateral extension 903 on which may be printed or affixed a warning 904*a*. The nature of the warning is that the lock should not be engaged with the base or lower housing when waffles are being cooked. The lock is intended for compactness and stability during storage or transportation. The lateral extension 903 may be received within a second pocket 905 that is interconnected with the first pocket 904 that receives the lock body. The preferably flat exterior or visible surface 906 faces downward or away from the user when the lock body is concealed. However, as shown in FIG. 9(*b*) the warning label or indicator 904*a* faces forward and thus can be seen by the user when the lock body is in its extended position.

The user interface 107 is depicted in FIG. 10. The user inputs include a control with a luminous indicator ring 1020 for restarting the timer 1001 and the time display 1010, a button or control for initiating a single, fixed increment of additional cooking time (for example 30 seconds) 1002, a button or other control 1003 for initiating manual override of the automatic aspects of the cooking process, a rotating dial 1004 for simultaneously selecting cooking temperature and time and an adjustment knob or dial 1005 for varying the pre-established cooking time of a waffle. While the temperature selector 1004 is depicted as a rotating knob, it will be understood that it could also be a slide or other control element that provides either continuous or discreet control. The interface 107 further includes an alpha-numeric display 109. The display 109 has selectively displayable portions to provide information to the user. The display also changes colour (e.g. white to red) when the upper housing is closed. A first portion 1006 selectively alerts the user to close the lid or upper housing to start the count down timer that displays the remaining time in a cooking time or interval. The first portion 1006 is not visible during a cooking cycle. Signals from the level or tilt or other sensors or switches (121, 120) allow the MCU to determine when the lid is closed. A second segment 1007 displays one of, for example, five discreet descriptors that correspond with the time setting or a combination of temperature and time in some embodiments. In the numbered list shown in the example of Figure to, five different batters are individually listable in the display. In this example, "1. CHOC/FRUIT" indicates the lowest selectable cooking temperature and is used for those batters that generally have the highest sugar content. The remaining four sub-segments of the display contain descriptors that correspond with the other four temperature settings on the temperature adjustment dial 1004. The controller will establish a cooking time that may be inversely proportional to the cooking temperature or not. A third segment 1008 illustrates a "sliding scale" with the word "light" at one end and the word "dark" at the other end. Individual arrow segments 1009 illuminate to show the degree of lightness or darkness either as set by the controller or selected by the user as a result of utilising the time/colour control knob 1005. Each of the individual arrows 1009 corresponds to a position of the time time/colour control knob 1005. A fourth segment 1010 contains numeric segments that can display the time remaining associated with any cooking operation. A further segment of the display is adapted to display either "add batter" 1021 (when the desired cooking temperature has been reached but the lid or upper housing is open) or "pre-heating" 1022 before the actual cooking temperature has been reached.

FIG. 11 illustrates an underside of the lower cooking plate 110 as well as a printed circuit board (PCB) 1101 to which the electro-mechanical components of the user interface are attached. In effect, the temperature adjustment knob 1004 is the primary user control and is preferably the physically largest user operable control on the interface. The knob 1004 is mounted to a front surface of the PCB 1101. The knob has a shaft which passes through the PCB 1101 and is associated with a potentiometer 1102. The potentiometer 1102 sends a signal to the device's MCU that is interpreted as the user's selection of temperature level. This information is used by the MCU to calculate the countdown time associated with the selected temperature. The knob's shaft 1103 has a transverse through hole or is otherwise attached to a coupling component having a transverse through hole (or the like) that allows the control knob 1004 to also act on a thermostat shaft 1104 as will be better explained with reference to FIG. 12.

With reference to FIGS. 11 and 12 it can be seen that a mechanical linkage 1201 interconnects the knob shaft 1103 with the thermostat's shaft 1104. The linkage facilitates the assembly of these remote parts. The thermostat shaft 1104 rotates a thermostat gear 1105. The thermostat itself (as shown in FIG. 11) is affixed to an underside of the lower plate and is therefore in intimate thermal contact with the lower plate. The thermostat provides temperature information to the micro controller. The primary knob 1004 is also associated with an on-off switch 1203 so that the primary knob 1004 can be used to switch the waffle maker 100 on or off.

The main control knob 1004 provides approximately 260 degrees (or time or combined temperature and time) of rotation, preferably encompassing five discreet temperature settings separated by approximately 52 degrees of rotation. In one embodiment the setting relates to an order of decreasing sugar content, the five settings being (as found on the alpha-numeric display) CHOC/FRUIT, CLASSIC, EGG WHITE, BUTTERMILK and SAVOURY. These designations are displayed, one at a time as the knob is rotated from the lowest temperature to the highest. The designations are displayed for a limited time (e.g. 30 seconds) every time the main knob 1004 is adjusted. After that only the selected designation is displayed.

Each arrow segment 1009 on the display is associated with e.g. 30 seconds of time deviation from the nominal pre-established setting established by the main knob 1004 in conjunction with the MCU. If the scale is already at a maximum darkness and the user adds more time, the arrow will blink. The time/colour adjustment adjusts the recommended cooking time by plus or minus 5 seconds for each stop on the encoding knob. Each arrow segment 1009 corresponds to 30 seconds of adjustment. If the time is adjusted during the cooking cycle, the micro processor's memory remembers the amount of time difference for the next cycle. The new adjusted count-down time is displayed dynamically. If the main control knob position changes, the MCU's memory remembers the time and darkness setting. If a new setting is selected on the main knob 1004, the user adjustment from the time/colour setting 1005 is added to the newly selected time by controller. The "A Bit More"™ button adds a fixed or user selected time, e.g. 30 seconds to the timer each time it is pressed. The "ADD BATTER" prompt or warning is only displayed once during a waffle making session. It is displayed from the first time the thermostat shuts the heating element off until the first time cycle begins. The "PRE-HEATING" notification is only displayed the first heating cycle and preferably, it flashes. Thereafter, only "heating" is displayed and it is displayed on every thermostat heating cycle.

The "Manual Control" button or input 1003 toggles between a "smart" mode and a "manual" mode. The smart mode is the default setting. In the smart mode, batter types are displayed 1007 and the darkness or colour or shade scale 1008 is displayed. In the manual mode, batter types are not displayed and the light/dark scale is not visible. The clock segment of the display is visible and the "manual" button back light is on.

In one particular embodiment of the technology, a thermostat 1301 is used to monitor the temperature of the lower plate 1302 and to switch the delivery of power to the heating elements in accordance with the sensed or indicated temperature. It is preferred that the thermostat 1301 be located centrally and below the lower plate 1302 and in intimate contact with the lower plate the thermostat 1301 may be a fixed thermostat or a variable thermostat. The switching state of the thermostat 1301 is provided to the device's MCU 1303. The MCU 1303 stores information relating to the state of the thermostat's contacts over time. The MCU 1303 also detects and optionally stores a more accurate record of the temperature of the plates as provided by the signal from an NTC thermistor 1304 that is in intimate contact with the lower plate. In preferred embodiments, the thermistor 1304 is located either centrally under a particular waffle cavity 1305 or centrally with regard to the lower plate 1306. As suggested by FIG. 14, the relatively low cost and robust thermostat 1301 may be replaced by a centrally located NTC thermistor 1401. The thermistor 1401 provides temperature information to the MCU 1402. The MCU 1402 communicates with a switching relay 1403 that switches the power delivered to the heating element or elements 1404. The switching state of the relay 1403 is monitored by the MCU 1402. Information regarding the temperature of the plates and the switching state of the thermostat or relay is used to provide information to the user, via the display 109 regarding an optimum time to add batter, when to close the plates together and when the waffle is cooked. This information is also used in the calculation of the correct cooking time as will be explained.

As shown in FIG. 15, and as preferably measured by the MCU and the NTC thermistor 1304, the measured temperature of the cooking plates changes over time. When the heating elements are first switched on 1501, the elements are at a nominal or ambient starting temperature. The delivery of power to the elements causes a rise in the temperature of the plate 1502. Because the plates have thermal inertia owing to their mass and composition, an optimum or nominal cooking temperature 1503 will be exceeded after the elements are switched off at the optimum cooking temperature 1503. The temperature will reach a maximum referred to as the overshoot temperature 1505. This can potentially serve as a point in time from which the processor will indicate via the display that pre-heating is finished and that batter may be added. Because power is no longer being supplied to the heating elements, the plates will cool 1506 thus, the plate's nominal cooking temperature is reached at a point in time 1507 when the heating elements are off. The point in time 1508 when the heating elements are on and the temperature of the plates begins to rise again constitutes another point in time when the MCU may deliver an instruction to the user, via the display log that it is time to "add batter" (see 1021 in FIG. 10). In some embodiments the "add batter" time may be delayed after a salient event. It will be appreciated that the measured temperature of the cooking plates will vary over time as the elements are switched on and off. Further, the precise moment in time in which the user adds batter cannot be either pre-determine or predicted by the MCU. Accordingly, in one embodiment, the MCU registers the drop in temperature from the output of the thermistor 1304 and uses that drop in temperature (by a predetermined amount) to indicate a moment in time when the batter has been added. Because the optimum or nominal cooking time will vary in accordance with the point in time in which the batter is added, the MCU assigns different cooking times (in this embodiment) in accordance with when batter is added. It will be understood that cooking time may refer to a time that is indicated or suggested to a user by a counter, timer or other indicator, or to a time after which cooking is terminated for example, by the switching off of a heating element or the ejection of a food like toast.

In the example of FIG. 16, the measured temperature profile over time 1601 is subdivided by the microprocessor into a number of manageable temperature bands 1602. In this example, each band represents a temperature range of approximately 20 degrees centragrade starting from about 120 degrees centragrade through to 239 degrees centragrade. Potential cooking time values are represented by time zones X1-X12 1603. Zones are preferably assigned, in the equal number (in this example 12) within each temperature fluctuation cycle 1604 being an equal number (6) between the temperature maximum 1605 and the temperature minimums 1606, 16.7 that the defined a beginning and end of a particular temperature fluctuation cycle 1604. It will be appreciated that the number of bands 1602 and the number of zones 1603 may deviate from the values provided by this example. The optimum cooking time will vary, depending upon whether or not the temperature of the plates is rising because the heating elements are switched on or falling because elements have been switched off. Accordingly, per FIG. 15 zone X1 represents a shortest actual cooking time and that cooking time and the other times are stored in a memory accessible to the MCU at the time of manufacture. Similarly, (per FIG. 16) if batter is added in the time zone X6, the cooking time will be the longest for a particular batter type. This is because the elements have been switched off after a temperature maximum 1605 has been reached. Thus, the MCU can identify a time zone X1-X12 in accordance with a sensed or measured drop in cooking plate temperature and the time that the drop occurred with reference either the temperature maximums and minimums or to the elements having been switched on 1606 or switched off 1605.

As shown in FIG. 17, a variable thermostat has at least 2 temperatures 1701, 1702 that may be selected by a user. The measured temperature of the waffle maker's plates varies for each selected temperature in the way depicted in FIG. 16. In a similar way, a temperature fluctuation cycle is subdivided into discreet time zones 1703, 1704 in accordance with pre-established temperature bands 1705. However, for each pre-selected temperature 1701, 1702 the cooking time values associated with each zone 1703, 1704 are different. The MCU uses a look-up table containing the cooking time values associated with each zone to determine the cooking time for a particular batter at the selected temperature 1701 or 1702.

As shown in FIG. 18, a look-up table of cooking time values comprises an array of stored values comprising fixed, individual pre-established suggested cooking times 1801 associated with each time zone 1802. In this example, the array comprises values for four different kinds of waffle batter 1803, 1804, 1805, 1806, each batter type having 12 discreet time zones based on 12 temperature bands 1807 comprising 6 bands that occur after a temperature minimum and 6 bands that occur after a temperature maximum 1808. A first type of batter 1803 is a Belgium waffle type. Other batter types may have factors such as a different sugar content or the presence of other ingredients that causes that batter type to have a different cooking time that the Belgium waffle batter type 1803. It will be appreciated that the time that is stored and therefore used by the MCU in respect of a particular zone may be varied by the user using the time/colour input or control 1005 (see FIG. 10).

In summary, one method of operation of the unit accounts for the initial pre-heating of the plates and the over-shoot of the nominal or cooking temperature. A user is provided with an indication after the first time that the heating elements have been turned off that the optimum pre-established cooking temperature has been reached for the first time. This indication provides the user with information in that it is appropriate to add batter. A temperature measuring device such as a thermistor than continuously measures the temperature of the cooking plates sends a signal to a MCU than indicates a drop in temperature of the cooking plates caused by the addition of batter. The point in time at which the batter is added is correlated with a temperature band in which it occurs. The band relates to the temperature as well as the switching state of the thermostat or relays that controls power to the heating elements. The results and value identifies a single time zone. Each time zone is associated with a pre-stored cooking time. A range of zone related cooking times is pre-stored for each selectable batter type. A user is able to adjust the pre-established time to either add or subtract time. The pre-established time and a countdown timer are displayed for the user's benefit. Alteration of the pre-established time results in an apparent movement of an indicator on the display. A graphic representation of the time remaining is also adjusted in accordance with the user's selection. At the end of the pre-established or user altered cooking time, the user is provided with an indication on the display. This signals the user to open the waffle maker and remove the cooked waffle even though the elements continue to operate. At any point during a cooking cycle or between cooking cycles, the user can select, using a single input such as a button, an additional increment of time that is added to the pre-established or user altered cooking time. This results in an alteration of the graphic representation of countdown time and the graphic indication of the lightness or darkness of the waffle.

In other embodiments the cooking time or information relating to the cooking time, such as the display of a count-down time, is based on when the upper housing is closed, as sensed by the level sensors located for example, in the upper housing. In embodiments of this type, the user is not provided with a prompt for when to add the waffle batter. However, recommended cooking times and subsequently a count-down of same are displayed on the user interface of the waffle maker and are based on the measured or detected cooking surface temperature as determined by a sensor such as an NTC thermistor 1304, a selection made by the user based on batter type, and optional lightness-darkness (time) adjustment that can be made by a user, an addition of a supplemental time interval being either a fixed or variable interval 1002 and optionally, the state of a thermostat associated with one of the cooking plates. An embodiment of this type is disclosed with reference to FIGS. 19-30.

As shown in FIG. 19, the temperature 1901 of the plates or cooking surfaces will vary over time in accordance with the state of the thermostat (e.g. 1301). The thermostat is considered "on" when its contacts are closed and power is being supplied to the heating elements. Conversely, the thermostat is considered "off" when the contacts are open. Consequently, the state of the thermostat will cycle between "on" states 1902 and "off" states 1903 while the device is in use. Adding batter to the lower plate at a point in time 1904 when the thermostat is off will cause a relatively fast decrease in temperature 1906 and may cause the actual temperature of the cooking surface to fall below the thermostat's nominal lower temperature limit 1907 for a specific temperature band. As shown in FIG. 19, adding batter when the thermostat is on 1908 causes only a modest decrease 1909 in the temperature of the cooking surfaces. For these reasons, batter that is added when the thermostat is off 1904 requires a longer cooking time than batter that is added 1908 when the thermostat is on.

A waffle maker made in accordance with the teachings of the invention can accommodate these differences in cooking time by detecting both the plate temperature and the state of the thermostat as suggested by FIG. 20. In embodiments of this type, the device's MCU consults and utilises a time value from a look-up table that has been populated with cooking times, the look-up being based on the measured plate temperature and the state of the thermostat, this information also being provided to the MCU. In the example of FIG. 20, the range of possible plate temperatures 2000 is subdivided into six (6) bands 2001. There may be more, or fewer bands. In this example, the lowest band represents the range of temperatures below 139 C. The second band 2003 represents temperatures between 140-159 C. The third band 2004 represents temperatures between 160-179 C. The fourth band 2005 represents temperatures between 180-199 C. The fifth band 2006 represents temperatures between 200-219 C. The sixth band 2007 represents temperatures at or above 220 C. For each temperature band, there are time values for a thermostat "on" state 2008 and a thermostat "off" state 2009. For each temperature band and thermostat state combination, there are four possible cooking times 201 because cooking time data has been stored in a look-up table for use by the MCU for four (4) different batter types 2011. In order to determine a nominal or default cooking time, the MCU reads the plate temperature sensed by the NTC thermistor at the time when the upper housing is closed or for example, when a significant or rapid temperature drop is detected by a sensor such as the thermistor. This is detected by a tilt switch or mechanical switch or proximity sensor as previously disclosed. In one example, the MCU determines that the plate temperature is 220 C when the upper housing is closed. This places the determined temperature in band six, 2007. For the purpose of this example it would be assumed that the MCU also detects the thermostat state as "on". Thus based on the aforementioned measurements and the selection of a batter type corresponding to a Belgium waffle 2014 the MCU will perform a look-up operation of the nominal or default cooking time in a register or memory location designated symbolically in FIG. 20 as "T21" 2014.

As shown in FIG. 21, the cooking process may be somewhat simplified by utilising a more thermally stable or thermally inert cooking surface, one whose temperature does not vary significantly between thermostat "on" and thermostat "off" states. The unit may also operate without reference to thermostat by for example, utilising a nominal or default cooking time that is effective in either the "on" or "off" state of the thermostat. Thus, and as shown in FIG. 21, the look-up operation performed by the MCU, being in this example "T18" 2100 is based solely on the batter type (in this example, "CLASSIC" 2102) and the sensed plate temperature (in this example, 210C) 2013.

As shown in FIG. 22, a user interface 2200 for operating a waffle making device fabricated in accordance with the previous examples comprises a graphic display 2201. The display includes alphanumeric segments 2202 that may be used to provide a countdown of the suggested cooking time and a further indication such as the word "end" when the countdown has reached zero. The heating elements are not turned off at the end of the count down. The display 2201 may also include an indication such as individual segments in a linear array 2203 that are indicative of the light-dark adjustment setting made by the user. In this example, the light-dark adjustment is made with a rotating knob 2204 having twelve (12) discreet settings. Each setting is represented by one segment in the array 2203. In some embodiments, the array 2203 can also serve as a countdown whereby the recommended cooking time is subdivided by the number of segments that are activated or illuminated, one segment being extinguished upon the elapsing of one said time interval, until no segments are activated or illuminated and the suggested cooking time has elapsed. The display 2201 may also contain a list of cooking modes 2205. In this example, there are four (4) modes corresponding to four (4) different batter types in order of sugar content, being: BELGIUM, CLASSIC, CHOCOLATE and BUTTERMILK. A fifth mode or item in the list 2206 correspond to a "custom" cooking mode in which the operation of the device is entirely manual.

Recipes for the aforementioned waffle types is provided below.

Belgium Waffle Batter
Makes: 12
Ingredients
4 eggs, separated
2½ cups milk
200 g unsalted butter, melted and cooled
2 teaspoons vanilla extract
3 cups self-raising flour
¼ cup caster sugar
Method
1. Place egg yolks, milk, butter and vanilla in a large jug and whisk until well combined.
2. Combine flour and sugar into a large mixing bowl and make a well in the centre.
3. Carefully whisk in egg milk mixture to form a smooth batter.
4. Beat egg whites with electric beaters until stiff peaks form. Gently fold egg whites into batter.
5. Pour ½ cup of batter into each waffle square and close lid to cook.

Classic Waffle Batter
Makes: 12
Ingredients
4 eggs
2½ cups milk
200 g unsalted butter, melted and cooled
2 teaspoons vanilla extract
3 cups self-raising flour
4 cup caster sugar
Method
1. Place eggs, milk, butter and vanilla in a large jug and whisk until well combined.
2. Combine flour and sugar into a large mixing bowl and make a well in the centre.
3. Carefully whisk in egg milk mixture to form a smooth batter.
4. Pour ½ cup of batter into each waffle square and close lid to cook.

Chocolate Waffle Batter
Makes: 12
Ingredients
200 g dark bittersweet chocolate, chopped
100 g unsalted butter, diced
3 eggs
2 cups milk
2 teaspoons vanilla extract
2½ cups plain flour
1 cups caster sugar
⅓ cup cocoa powder
1 teaspoon salt
Method
1. Place the chocolate and butter in a microwave safe bowl and heat on 100% power for 30 seconds. Stir and continue until chocolate and butter have melted and mixture is smooth; set aside to cool slightly.
2. Whisk eggs, milk and vanilla together in a large jug and stir through cooled chocolate mixture until smooth.
3. Sift flour, sugar, cocoa powder, baking powder and salt together in a large mixing bowl, and make a well in the centre.
4. Pour in egg mixture and whisk until mostly smooth with just a few lumps
5. Pour ½ cup of batter into each waffle square and close lid to cook.

Buttermilk Waffle Batter
Makes: 12
Ingredients
4 eggs
600 ml buttermilk
½ cup vegetable oil (such as sunflower or canola)
2½ cups self-raising flour
⅓ cup caster sugar
1 teaspoon salt
Method
1. Place eggs, buttermilk and vegetable into a large jug and whisk until well combined.
2. Combine flour, sugar and salt into a large mixing bowl and make a well in the centre.
3. Carefully whisk in egg buttermilk mixture to form a smooth batter, with just a few lumps.
4. If batter is too thick, stir in 1-2 tablespoons of buttermilk. Pour ½ cup of batter into each waffle square and close lid to cook.

The user selection of a mode in the list 2205 is made using a rotating knob 2207, or a slider of push buttons. In this example, the knob has discreet click-stops, one stop corresponding to each item in the list 2205. The interface also features a restart button 2208 for restarting the timer and an "a bit more" button 2209 for adding either a fixed or user variable time interval to the suggested time interval as determined by the device's MCU.

FIGS. 20 and 21 and the related portions of this specification disclose a method whereby a processor or MCU in a waffle maker can determine a nominal or default cooking time 2013, 2014, 2100. In addition, the MCU or processor can use the nominal or default cooking time and optionally modify it to produce a resultant or actual cooking time based on additional factors. For example, the MCU can use the detected temperature drop, as measured by the NTC thermistor, when batter is added to determine if and how much additional cooking time is required. Further, the MCU can add additional time based on the single input "A Bit More" user control button 2209, 1002 as previously disclosed. The MCU can also modify the nominal or default cooking time in accordance with a lightness-darkness selection resulting for the user input. As discussed with reference to FIG. 22, the user interface may have a lightness-darkness adjustment input such as a knob 2204. In the example of FIG. 22, there are 12 discreet settings available the knob 2204. As suggested by FIGS. 23-30, the lightness-darkness setting can result in the additional or subtraction of time, from the nominal or default cooking time, to result in actual cooking time. In any event, it is preferred that the actual cooking time (based on the nominal or default cooking time compensated by other factors) be displayed after the upper housing is closed. The actual cooking time that is displayed is then used as a basis for the display of a countdown which when finished, is a prompt for the user to open the upper housing and remove the cooked waffle. In the examples depicted in FIGS. 23-30, and for each waffle type and thermostat state, there are four cooking bands. Each band is associated with twelve bars, corresponding to the twelve settings on the user input 2204. If there is no additional user input, the lightness-darkness default setting is represented by the value "6" in each of the temperature bands depicted in FIGS. 23-30. For example, in FIG. 23, in the lowest band 2304 the nominal or default suggested cooking time (corresponding to six bars) is 315 seconds. The micro processor determines the time values for each of the other lightness-darkness settings by dividing the nominal or default cooking time (315 seconds) by six. In this example, the resulting increment is 52.5 seconds. This value represents at least the approximate incremental difference between adjacent settings or "bars" in the lightness-darkness setting knob 2204 and in the corresponding display 2203. With reference to the lowest setting, it may be determined by subtracting 10 seconds from the second to lowest setting. This has been empirically determined based on the particular plates, heating element FIG. 23 represent schematically, a look-up table corresponding to a user selection of a Belgium waffle type where the upper housing is closed when the thermostat is in an "on" state. In this example, the entire range of plate temperatures has been subdivided into four (4) bands 2300 and each band is associated with twelve (12) optional lightness-darkness settings that are user selectable 2301. For each lightness-darkness setting in each temperature band there is a time value 2302 stored and accessible to the MCU. In this example, the time value associated with a lightness-darkness setting of six (6) represents the default cooking time in each temperature band. In the temperature band corresponding to a determined plate temperature of 159 C or less, the default cooking time is 315 second. This corresponds to an alphanumeric display on the graphic display 2201 of 5:15 2303. In this example, the increment between different lightness-darkness settings is determined by dividing the default cooking time by six (6). As previously mentioned, each upward or downward adjustment from the nominal or default value of six (6) represents a time interval of 52.5 seconds. In this particular example, the interval between the two (2) lowest darkness-lightness settings is determined by subtracting ten (10) seconds form the second lowest value. Accordingly, the second time value in the lowest temperature band is 105 seconds and the time value for the lowest darkness-lightness setting is 95 seconds. FIG. 24 provides data for the time look-up values associated with a Belgium waffle selection made by the user when batter is added while the thermostat state is "off". A comparison of the cooking times in FIGS. 23 and 24 will reveal that the cooking times are uniformly longer when batter is added in the thermostat "off" state.

FIG. 25 provides examples of cooking times determinable by the MCU from a look-up table for a "Classic" batter type that is added when the thermostat state is "on". FIG. 26 provides corresponding data for when batter is added while the thermostat state is "off".

FIG. 27 provides examples of cooking times determinable by the MCU from a look-up table for a "Buttermilk" batter type that is added when the thermostat state is "on". FIG. 28 provides corresponding data for when batter is added while the thermostat state is "off".

FIG. 29 provides examples of cooking times determinable by the MCU from a look-up table for a "Chocolate" batter type that is added when the thermostat state is "on". FIG. 30 provides corresponding data for when batter is added while the thermostat state is "off".

The aforementioned disclosure pertains to a waffle maker that calculates a nominal or default cooking time in accordance with a first user action (being a closing of the upper housing), a measured plate or cooking surface temperature, an optional consideration of a thermostat state, a user input relating to a batter type, and optional parameters such as a user input regarding a desired lightness or darkness or the addition of a fixed or variable additional time by way of a single button input.

The toaster of FIG. 31 may have a user interface as depicted in FIG. 32. The user interface may consist of components such as a graphic display 3200, in this example, the graphic display 3200 contains a graphic list of food or bread types 3201. In this example, each item in the list 3201 is associated with a "moving" indicator 3202 which may be activated or illuminated so as to indicate a selection made by a user. The user's selection of bread or food type 3202 may be accomplished with, for example, a rotating knob 3203. Rotation of the knob 3203 communicates information to the processor which indicates the selection and causes the processor to change which item in the list 3201 is associated with the indicator 3202. Each bread or food type in the list 3201 is associated with a default or nominal cooking time stored in a register or memory location of a look-up table that the processor can read 3005. In some embodiments, the default or nominal toasting or cooking time is indicated in an alphanumeric display 3204. However, the initial, default or nominal toasting time may be altered in accordance with one or more user inputs to result in an actual toasting time. In one example, the exterior of the toaster features a slide type user control 3205 or another rotating selector knob similar to the food type selector 3203. The food type selector 3203 may be used for both purposes when a toggle switch is provided. In preferred embodiments, the slider or other user control 3205 allows the user to select from a discreet number of settings, each setting having the effect of either decreasing or increasing the default or nominal toasting time. This increase or decrease in the nominal or default toasting time is referred to as adjustment over toast lightness or darkness. The extent of lightness or darkness requested by the user using the control 3205 is represented in the graphic display 32000 by an array of discreet segments 3206. In this example, the range of cooking times selectable by the user and including the default time is represented by ten (10) discreet segments. The extent to which the array is activated or illuminates indicates the user selection from the control 3205. The aforementioned look-up table can be provided with calculated, algorithmic or empirically determined times representing the increment up or down from the nominal or default time in accordance with the selection from the control 3205. When a user selection is made using the control 3205, the resulting or actual cooking time is then displayed by the alphanumeric segments 3204. Further adjustment to the actual cooking time may be accomplished with a single push button input 3207 that adds a fixed or user selectable increment to the previously determined cooking time. This is similar to the user control 1002 described previously. A further form of user modification of the initial cooking time is a push button or other user input for selecting a supplementing of the aforementioned cooking times by an additional increment when the defrosting of a frozen or partially frozen food item is required. The amount of defrosting may vary in accordance with different items in the list 3201. A single or individually selected defrost time increments may be contained in the look-up table for the use by the processor 3005. In this example, the toaster works by the user making selections represented by the various inputs 3203, 3205, 3206, 3207, 3208 then pressing a start/stop button or user input 3209. The toasting or cooking operation will continue until the actual cooking time elapses whereupon the toast rack 3204 will rise and power will be turned off to the heating elements. If the start/stop input 3209 is depressed mid-cycle, the cooking cycle will be discontinued, the elements will be turned off and the food rack 3004 will rise.

Accordingly, there exists a method for an appliance such as a waffle maker or a toaster or a toaster oven to cook or toast foods in accordance with various parameters and user inputs. This method is represented by the flow chart depicted in FIG. 33. In this method, an MCU or processor 3300 determines the state of various user inputs 3301. The user inputs may include a selection of food type made using a selector or control on an interface, a selection regarding extent of cooking such as lightness or darkness, a selection based on food texture such as one related to desired moisture level or crispness, the selection of a compensation factor such as a request for additional time based on the need to defrost a food item, a request for an increment of additional or supplemental time based on a user specific preference 1002 or other factors. The MCU or processors 3300 may also receive information from sensors or switches associated with the physical state, thermostat state or other properties of a cooking device 3302. In this way, the processor 3300 is informed of parameters such as cooking cavity or cooking surface temperature, the state of a thermostat (on or off), upper housing or toast rack position ambient temperature etc. In essence, the processor, when instructed to do so by a command from a user input such as a 'start' button 3303 will use the various user inputs 3301 and the properties 3302 to make a determination about which register or cell in a look-up table to consult. As previously mentioned, the processor may resort to a look-up of nominal or default cooking time 3304, then modify 3305 that time, if required, by employing a algorithm that takes into account the inputs 3301 and properties 3302 to determine which register or memory location in the look-up table of cooking times to use as the actual cooking time. Generally, at the end of the actual cooking time the user is provided by an indication 3306 that the cooking process is complete or, the device itself effectively ceases to operate, optionally ejecting the food that has been cooked in accordance with the previous method.

While the present invention has been disclosed with reference to particular details of construction, these should be understood as having been provided by way of example and not as limitations to the scope or spirit of the invention.

What is claimed is:

1. An electrical waffle making device comprising: a base that is connected to an upper housing with a hinge; the upper housing having a handle and an upper cooking plate and the base supporting a lower cooking plate, the upper and lower cooking plates forming a cavity when brought together, wherein the cavity is arranged to receive batter for making a waffle, and wherein
    the lower cooking plate includes an outer rim and a continuous peripheral moat adjacent to and surrounding the outer rim and wherein the peripheral moat is arranged to contain excess batter flowing over the outer rim, a portion of the outer rim extending to an edge of a shoulder;
    the peripheral moat formed adjacent to where the upper and lower cooking plates are brought together to meet at the edge, wherein a bead extending from one of the cooking plates contacts the edge of the other of the cooking plates, the peripheral moat sized so as to remain exposed and uncovered by the upper housing when the upper and lower cooking plates are brought together;
    the hinge arranged to allow the upper housing to float in parallel with the base; and
    wherein the hinge includes lower hinge elements that are integral with the lower plate, and a pair of upper hinge elements engaging the lower hinge elements, the hinge having a pin at a rear pivot location and a pin at an intermediate pivot location on the upper hinge elements, and wherein the lower hinge elements are located outwardly of the peripheral moat.

2. The device of claim 1, wherein:
the peripheral moat has an internal radius of at least 5 mm.

3. The device of claim 1, wherein:
the peripheral moat has an internal radius of 5 mm to 11 mm.

4. The device of claim 1, wherein:
the peripheral moat has an internal radius of 11 mm or larger.

5. The device of claim 1, wherein:
a ratio of a volume of the peripheral moat to a volume of the waffle cooked by the device is between 1:4.9 and 1:10.

6. The device of claim 1, wherein:
a pivot is disposed between the upper and lower hinge elements and above the peripheral moat.

7. The device of claim 1, wherein:
the upper hinge elements are interconnected by a bracket.

8. The device of claim 1, wherein:
an extent of a parallel separation between the upper cooking plate and the lower cooking plate is limited by a bumper formed on an upper surface of the upper cooking plate that contacts the hinge.

9. The device of claim 1, wherein:
a lock mechanism extends between the upper housing and the peripheral moat.

10. The device of claim 9, wherein:
the lock mechanism is retained by the handle.

11. The device of claim 1 wherein:
a ratio of a volume of the peripheral moat to a volume of the waffle cooked by the device is more than 1:4.9.

12. The device of claim 1 wherein:
a ratio of a volume of the peripheral moat to a volume of the waffle cooked by the device is 1:4.9.

13. The device of claim 1, wherein:
the peripheral moat is integral with the lower cooking plate.

14. The device of claim 1, wherein:
the peripheral moat has a cross-section being in the shape of a semi-circle.

15. The device of claim 1, wherein:
the peripheral moat is continuous.

16. The device of claim 1, wherein:
the upper cooking plate or the lower cooking plate includes a vertically-extending rim defining at least a portion of the outer rim of the cavity.

17. An electrical waffle making device comprising:
    a base is connected to an upper housing with a hinge;
    the upper housing having a handle and an upper cooking plate and the base supporting a lower cooking plate, the upper and lower cooking plates forming a cavity when brought together, wherein the cavity is arranged to receive batter for making a waffle;
    an outer rim of the lower plate extending to a shoulder formed at an uppermost portion of the lower cooking plate adjacent an outer edge of the cavity, the shoulder being where the upper and lower cooking plates are brought together, the lower cooking plate having a continuous peripheral moat arranged to contain excess batter flowing over the rim;
    the peripheral moat formed adjacent to and outwardly of the outer rim and the shoulder, with the peripheral moat being disposed below the peripheral shoulder, the peripheral moat sized so as to remain exposed and uncovered by the upper housing when the upper and lower cooking plates are brought together at a bead extending from the upper cooking plate contacting the shoulder of the lower cooking plate; and
    the hinge arranged to allow the upper housing to float in parallel with the base.

18. The device of claim 17, wherein the hinge includes lower hinge elements that are integral with the lower plate, and a pair of upper hinge elements engaging the lower hinge elements, the hinge having a pin at a rear pivot location and a pin at an intermediate pivot location on the pair of upper hinge elements, and wherein the lower hinge elements are located outwardly of the peripheral moat.

19. The device of claim 17, wherein:
a pivot is disposed between the upper and lower hinge elements and above the peripheral moat.

20. The device of claim 17, wherein:
the upper hinge elements are interconnected by a bracket.

21. The device of claim 17, wherein:
an extent of a parallel separation between the upper cooking plate and the lower cooking plate is limited by a bumper formed on an upper surface of the upper cooking plate that contacts the hinge.

22. The device of claim 17, wherein:
a lock mechanism extends between the upper housing and the peripheral moat, and wherein the lock mechanism is retained by the handle.

* * * * *